US 8,260,139 B2

(12) United States Patent
Suzuki et al.

(10) Patent No.: US 8,260,139 B2
(45) Date of Patent: Sep. 4, 2012

(54) DISPERSION COMPENSATOR

(75) Inventors: Kenya Suzuki, Atsugi (JP); Kazunori Seno, Atsugi (JP); Naoki Ooba, Atsugi (JP); Shinji Mino, Atsugi (JP); Motohaya Ishii, Atsugi (JP)

(73) Assignee: Nippon Telegraph & Telephone Corp., Tokyo (JP)

( * ) Notice: Subject to any disclaimer, the term of this patent is extended or adjusted under 35 U.S.C. 154(b) by 344 days.

(21) Appl. No.: 12/664,728

(22) PCT Filed: Jun. 25, 2008

(86) PCT No.: PCT/JP2008/061525
§ 371 (c)(1),
(2), (4) Date: Dec. 15, 2009

(87) PCT Pub. No.: WO2009/001847
PCT Pub. Date: Dec. 31, 2008

(65) Prior Publication Data
US 2010/0183310 A1 Jul. 22, 2010

(30) Foreign Application Priority Data

Jun. 25, 2007 (JP) ................................. 2007-166887
Feb. 21, 2008 (JP) ................................. 2008-040579

(51) Int. Cl.
*H04J 14/02* (2006.01)
*H04B 10/18* (2006.01)

(52) U.S. Cl. ......................................................... 398/81
(58) Field of Classification Search ...................... 398/81
See application file for complete search history.

(56) References Cited

U.S. PATENT DOCUMENTS

| 6,122,419 A | 9/2000 | Kurokawa et al. |
| 6,892,003 B2 | 5/2005 | Katayama et al. |
| 7,369,773 B2 * | 5/2008 | Weiner ............................ 398/81 |

FOREIGN PATENT DOCUMENTS

| JP | 11-95051 | 4/1999 |
| JP | 2002-303805 | 10/2002 |

(Continued)

OTHER PUBLICATIONS

K. Takiguchi et al., *Dispersion Slope Equalizer on Planar Lightwave Circuit for 40 Gbit/s Based WDM Transmission*, Electronics Letters, vol. 37, No. 24, Nov. 22, 2001, pp. 1469-1470.

(Continued)

*Primary Examiner* — Leslie Pascal
(74) *Attorney, Agent, or Firm* — Workman Nydegger

(57) ABSTRACT

Conventional dispersion compensators were not sufficient to satisfy a demand to set a different dispersion value for each WDM wavelength in a ring-mesh type network that utilizes wavelength selective switches or the like. The devices were insufficiently reduced in size and power consumption and used with difficulty to change dispersion characteristics for each wavelength flexibly in a simple manner. A dispersion compensator of the present invention uses general-purpose optical components including a spatial light modulator for providing discrete phases to set appropriately the relationship between the focusing beam radius and the spatial light modulator pixel, thereby providing various dispersion compensation characteristics. Attention is focused on the correspondence between multiple pixels on the spatial light modulator providing discrete phases and a communication channel band, thereby allowing for changing the flexible dispersion characteristics and realizing the setting of an independent dispersion value for each WDM wavelength.

30 Claims, 32 Drawing Sheets

FOREIGN PATENT DOCUMENTS

JP        2006-106769        4/2006

OTHER PUBLICATIONS

*2004 Report on Research and Development outcomes: Research and Development of High-Performance Integrated Optical Switching Node for Implementing Economical Optical Networks*, Independent Administrative Institution-Information Communication Study Organization, 2006, pp. 1-50 (partial translation).

X. Fan et al., *Chirped Fiber Grating Characterization with Phase Ripples*, Proceedings of OFC2003, vol. 2, 2003, pp. 638-640.

Kazunori Seno et al., *Channel-by-Channel tunable Optical Dispersion Compensator Consisting of Arrayed-Waveguide Grating and Spatial Light Modulator*, The Institute of Electronics, Information and Communication Engineers Sogo Taikai Koen Ronbunshu, Electronics 1, Mar. 5, 2008, p. 236 (partial translation).

Kazunori Seo et al., *Novel Tunable Optical Dispersion Compensator Consisting of Arrayed-Waveguide Grating and Flat Mirror*, Japan Society of Applied Physics and Related Societies, Mar. 27, 2008, vol. 3, p. 1238 (partial translation).

David T. Nielson et al., *MEM-Based Channelized Dispersion Compensator with Flat Passbands*, Journal of Lightwave Technology, vol. 22, No. 1, Jan. 2004, pp. 101-105.

Andrew M. Weiner et al., *Programmable Shaping of Femtosecond Optical Pulses by Use of 128-Element Liquid Crystal Phase Modulator*, IEEE Journal of Quantum Electronics, vol. 28, No. 4, Apr. 1992, pp. 908-920.

\* cited by examiner

| | | STRUCTURE | DISPERSION CAPABILITY | DIFFRACTION LOSS | PDL | CONDITIONS/REMARKS |
|---|---|---|---|---|---|---|
| REFLECTION TYPE | BLAZE TYPE | | 0.44 deg/nm | 0.9 dB | < 0.2 dB | NUMBER OF GROOVES: 600/MM, 1ST ORDER, LITTROW ARRANGEMENT |
| | HOLOGRAM TYPE | | 0.08 deg/nm | 1.2 dB | < 0.2 dB | NUMBER OF GROOVES: 300/MM, 3RD ORDER, LITTROW ARRANGEMENT |
| | | | 0.12 deg/nm | 0.6 dB | < 0.25 dB | NUMBER OF GROOVES: 1100/MM, 1ST ORDER, LITTROW ARRANGEMENT |
| | ECHELLE TYPE | | 0.15 deg/nm | 1.6 dB | < 0.3 dB | NUMBER OF GROOVES: 52.67/MM, 22ND ORDER, LITTROW ARRANGEMENT |
| TRANSMISSION TYPE | VPG TYPE | | 0.04 deg/nm | < 0.3 Db (S-POLARIZATION) | < 0.8 dB | NUMBER OF GROOVES: 600/MM, 1ST ORDER, BRAGG CONDITION TRADEOFF BETWEEN DIFFRACTION LOSS AND PLD |
| | | | 0.08 deg/nm | < 0.3 Db (S-POLARIZATION) | < 5 dB | NUMBER OF GROOVES: 900/MM, 1ST ORDER, BRAGG CONDITION TRADEOFF BETWEEN DIFFRACTION LOSS AND PLD |
| | E-VPG TYPE | | 0.08 deg/nm | < 0.3 dB | < 0.25 dB | NUMBER OF GROOVES: 940/MM, BRAGG CONDITION |
| | | | 0.18 deg/nm | < 0.7 dB | < 0.3 dB | NUMBER OF GROOVES: 1200/MM, BRAGG CONDITION |

FIG. 20

| | | | |
|---|---|---|---|
| ROADM (COMPENSATING EACH CH) | (a) Demux → DCF → PD | (b) CONVENTIONAL TODC Demux → DCF → PD | (c) INVENTIVE TYPE EACH CH INDIVIDUALLY COMPENSATED Demux → PD |
| Point-to-Point (ALL CHS COLLECTIVE OR SLOPE COMPENSATION) | (d) Demux → DCF → PD | (f) CONVENTIONAL TODC Demux → DCF → PD | (g) DCF + DISPERSION SLOPE COMPENSATION Demux → PD |
| TRANSMISSION RATE / DISPERSION TOLERANCE | 10Gbit/s ~1000ps/nm | 40Gbit/s 70ps/nm | 40Gbit/s 70ps/nm |

FIG. 24

DISPERSION COMPENSATOR

TECHNICAL FIELD

The present invention relates to a dispersion compensator to be used in optical fiber communications.

BACKGROUND ART

With the explosive growth of the Internet as a backdrop, wavelength division multiplexing (WDM) communication is now being transferred from the conventional point-to-point type system to the ring-mesh type system. This is because the ring-mesh type system can use a transparent wavelength selective switch or the like which processes an optical signal without changing its optical state, thereby flexibly handling variations in demand for communications between nodes. However, when optical paths are changed over in the ring-mesh type network, the dispersion values of the paths also change dynamically. This in turn requires adaptability to dispersion compensation in the optical communication path. Conventional dispersion compensators were predominantly of a type that collectively compensate a plurality of channels. However, in the ring-mesh type network which uses wavelength selective switches, optical signals of different wavelengths pass through paths of different distances. Accordingly, there was a demand to set a different dispersion value for each WDM wavelength.

For example, adaptive dispersion compensation techniques that were suggested to address such demands include those using a dispersive element and a mirror array (Patent Document 1), a waveguide (Patent Document 1 and Non-Patent Document 1), and a three-dimensional mirror and a dispersive element (Non-Patent Document 2).

Patent Document 1: Japanese Patent Laid-Open No. 2002-303805 (pp. 5-7, FIGS. 1 and 11)

Non-Patent Document 1: K. Takiguchi, K. Okamoto, and T. Goh, "Dispersion slope equalizer on planar Lightwave circuit for 40 Gbit/s based WDM transmission," Electron. Lett, 37 (24), pp. 1-2, 2001

Non-Patent Document 2: Independent Administrative Institution-Information Communication Study Organization, "2004 Report on research and development outcomes: Research and development of high-performance integrated optical switching node for implementing economical optical networks," 2006.

Non-Patent Document 3: X. Fan, et al., "Chirped fiber gratings characterization with phase ripples," Proceedings of OFC2003, Vol. 2, pp. 638-640 (2003)

DISCLOSURE OF THE INVENTION

However, these conventional techniques involve various problems, as will be mentioned below, and are thus not satisfactory. For example, Patent Document 1 disclosed a dispersion compensator having a combination of a spectroscope and a mirror array. In FIG. 1 of Patent Document 1, this dispersion compensator generates dispersion by moving the mirror array in the direction of d and thereby imparts a wavelength-dependent phase shift. Furthermore, in FIG. 10 of Patent Document 1, it is shown, by way of example, that the mirror array provides a phase shift in the range of 0 to −12 rad. To set this amount of phase shift, a path-length difference of about a few wavelengths is set in the direction of d between a mirror corresponding to the center wavelength of a certain communication band and a mirror corresponding to the wavelength of the extreme end of the communication band. However, an optical signal reflected on a certain mirror may often be hidden behind an adjacent mirror. Furthermore, when a mirror is moved in a wide range in the direction of d to set a large amount of phase shift, the beam waist of the optical signal incident upon the mirror would be displaced from the mirror plane, thereby causing coupling loss.

In FIG. 11 of Patent Document 1, the curved shape of the reflective surface of the mirror can be deformed to a parabolic shape or the like, thereby avoiding the optical signal reflected on a certain mirror from being hidden behind an adjacent mirror. However, since the shape of the mirror is restricted by the dynamic physical properties of the mirror material, it is difficult to set a specified dispersion value to a desired arbitrary value.

FIG. 30 is a view illustrating the configuration of another dispersion compensator which uses the arrayed-waveguide grating disclosed in Patent Document 1. In FIG. 30, the optical signal spatially dispersed by an arrayed waveguide 39 is guided to a mirror array 37 through an output waveguide group 35. Accordingly, the optical signal subjected to a phase shift through the output waveguide group 35 becomes a discrete signal on the frequency axis. The optical signal emitted from an input/output waveguide 31 becomes a spectrum train at a wavelength associated with the position of the output waveguide group 35. Since the dispersion provided for the optical signal is a differentiated phase, the optical signal is discrete on the frequency axis as described above, thereby causing an intense ripple in the given dispersion. As a result, undesired large ripples will occur to the amount of group delay added to the optical signal as the dispersion compensator.

FIG. 31 is a view illustrating the configuration of a lattice filter dispersion compensator which was made up of a silica-based optical waveguide disclosed in Non-Patent Document 1. This dispersion compensator is an example of a variable frequency dispersion device which can set a different dispersion value for each wavelength. In this example, using a waveguide having a 1.5% relative index difference, eight channel lattice filter dispersion compensators 42 are integrated as one dispersion compensator array 41. Each channel is combined through an arrayed-waveguide grating 44, thereby providing individual dispersion compensation for the multiple channels. A coupling fiber group 43 couples between the arrayed-waveguide grating 44 and each dispersion compensator 42.

The dispersion compensator shown in FIG. 31 has a size as large as 83 mm×83 mm including the 8-channel dispersion compensator array 41. A typical WDM system uses about 40 as the number of wavelengths. Accordingly, five dispersion compensator arrays 41 each configured as shown in FIG. 31 are required, and a large space is thus needed to implement the device. Furthermore, in the example configured as shown in FIG. 31, a phase shifter using a thermo-optic effect is used to implement the variability of the dispersion compensation characteristics, resulting in an increase in its power consumption.

FIG. 32 is a view illustrating the configuration of a dispersion compensator, disclosed in Non-Patent Document 2, which can implement channelized dispersion compensation using a VIPA (Virtually imaged phased array) and a three-dimensional mirror. The optical signal from an input/output fiber 51 is supplied to a diffraction grating 53 via a group of collimating lenses 52a and 52b. The lightwave spatially dispersed with the diffraction grating 53 and a focusing lens 54 is focused on a MEMS mirror array 55 for each WDM signal. Each WDM signal reflected upon the MEMS mirror array 55 is combined through the diffraction grating 53, allowing the optical axis to be shifted to a different position in the direction of y depending on the angle setting of the MEMS mirror array 55.

The optical signal combined through the diffraction grating 53 is given an individual dispersion value for each wavelength through a dispersion compensation optical system 56. The dispersion compensation optical system 56 mainly consists of a VIPA plate 57 and a three-dimensional mirror 58. The VIPA plate 57 causes each WDM signal to be spatially dispersed on the three-dimensional mirror 58, so that the dispersion value to be set is determined depending on the curvature of the mirror located for the lightwave to impinge on the three-dimensional mirror 58. The WDM signal propagating in a different y direction will hit a different position on the three-dimensional mirror, and can thus have a different amount of dispersion to be set for each channel.

However, to implement the dispersion compensator which uses the VIPA and the three-dimensional mirror as shown in FIG. 32, it was necessary to fabricate a complicated structure with a plurality of lenses and diffraction gratings arranged therein, causing difficulties in implementation design and raising problems with fabrication costs. The setting of dispersion values is determined by the shape of the three-dimensional mirror 58. Accordingly, in accurately compensating for high-order dispersion occurring and intended to be compensated for in the optical fiber, the dispersion compensator shown in FIG. 32 had a drawback that multiple three-dimensional mirrors had to be replaced based on the characteristic of each optical fiber. Furthermore, the distribution of optical intensity on the three-dimensional mirror 58 is desirably in the Gaussian shape in the direction of the x-axis in terms of reduction in loss and the symmetry of transmitted spectra. However, from the principle of VIPA, the electric field distribution on the three-dimensional mirror 58 will be distorted. As a result, there were some problems with optical characteristics such as an increase in loss and asymmetry of transmitted spectra.

The present invention was developed in view of these objects. It is thus an object of the present invention to realize a dispersion compensator capable of using small inexpensive optical components to set dispersion characteristics flexibly for each communication channel. This object also includes reducing the overall device size, decreasing its power consumption, eliminating loss, and improving optical characteristics such as maintaining the symmetry of transmitted spectra.

To achieve these objects, a dispersion compensator according to an embodiment of the present invention includes a first dispersive element for dispersing an optical signal at an angle according to a wavelength of an input optical signal. The dispersion compensator further includes at least one focusing lens for focusing the optical signal from the first dispersive element, and a spatial light modulator for controlling a phase of the optical signal focused with at least one focusing lens. The dispersion compensator is characterized in that a phase distribution given by a function expressed in a second-order or more polynomial along a first dispersion axis is imparted to the optical signal in the direction of the first dispersion axis. Here, the direction of the first dispersion axis is defined as an intersecting line between a plane of the spatial light modulator and a first dispersion plane formed by the first dispersive element.

When a phase value exceeds $2\pi$ in the phase distribution, a remainder phase obtained by dividing the phase value exceeding $2\pi$ by $2\pi$ can be imparted to the optical signal.

Preferably, the spatial light modulator includes a plurality of pixels to each of which a discrete phase value can be set and which are repeatedly arranged in the direction of the first dispersion axis. The dispersion compensator preferably satisfies the following relationship, $$wx \geq wp,$$

where a beam radius wx is defined as a distance at which an optical intensity of monochromatic light is $1/e^2$ of a peak value on the spatial light modulator plane, and wp is a repetitive distance of the pixel. Furthermore, the spatial light modulator can have a plurality of pixel arrays arranged at a repetitive distance wSLMv in a direction of a second dispersion axis orthogonal to the direction of the first dispersion axis.

More preferably, the dispersion compensator can satisfy the following relationship;

$$wv \leq wSLMv/2$$

where a radius wv in the direction of the second dispersion axis is defined as a distance at which an optical intensity of monochromatic light is $1/e^2$ of a peak strength on the spatial light modulator plane, and wSLMv is a repetitive distance of the pixel array in the direction of the second dispersion axis.

A dispersion compensator according to another embodiment of the present invention can satisfy the following relationship;

$$wSLMv \ll wv,$$

where a radius wv in the direction of the second dispersion axis is defined as a distance at which an optical intensity of monochromatic light is $1/e^2$ of a peak strength on the spatial light modulator plane, and a wSLMv is a repetitive distance of the pixel array in the direction of the second dispersion axis. At this time, the amount of dispersion imparted to an input optical signal and the loss can be set independently according to the phase distribution in the direction of the first dispersion axis and according to the phase distribution in the direction of the second dispersion axis, respectively.

when a desired phase setting value is $\phi$ for a position in the direction of the first dispersion axis, consider the position being encompassed in a pixel group covered with a light beam at a focal point. In this case, preferably, a phase distribution is imparted to a plurality of pixels which include the position and arranged in a direction orthogonal to the first dispersion axis such that the average value of the phases of the plurality of pixels weighted according to the optical power incident upon each pixel is equal to $\phi$.

The dispersion compensator according to each of the aforementioned embodiments of the present invention preferably further includes a second dispersive element interposed between the cylindrical lens and the focusing lens, the second dispersive element having a second dispersion plane approximately orthogonal to the first dispersion plane of the arrayed-waveguide grating. The spatial light modulator can have two-dimensional pixels arranged repeatedly in a cyclic manner, respectively, along the first dispersion axis corresponding to the first dispersion plane and the second dispersion axis approximately orthogonal to the first dispersion axis corresponding to the second dispersion plane. This allows for setting an independent dispersion value freely for multiple communication channels.

Furthermore, the free spectral range of the arrayed-waveguide grating can be made equal to a grid wavelength interval of a WDM optical signal for which a dispersion compensation is made based on the phase distribution. Furthermore, the following relationship preferably is satisfied:

$$wv \leq dv/d\lambda \times FSR,$$

where a radius wv on the second dispersion axis is defined as a distance at which an optical intensity of monochromatic light is $1/e^2$ of a peak strength on the spatial light modulator plane; $dv/d\lambda$ is a linear dispersion on the spatial light modulator plane of the second dispersive element; and FSR is a free spectral range of the arrayed-waveguide grating.

The dispersion compensator according to another embodiment of the present invention includes a first dispersive element for dispersing an optical signal at an angle according to a wavelength of an input optical signal; at least one focusing lens for focusing the optical signal from the first dispersive element, and a spatial light modulator for controlling a phase of the optical signal focused with at least one focusing lens. The spatial light modulator includes a plurality of pixels to each of which a discrete phase value can be set, the plurality of pixels being repeatedly arranged in a direction of a first dispersion axis defined as an intersecting line between the spatial light modulator plane and a first dispersion plane formed by the first dispersive element. The plurality of pixels are divided into a plurality of sections each including some of the plurality of pixels, so that in each of the sections, a phase distribution provided by a function expressed in a second-order or more polynomial for the first dispersion axis is independently allocated to the optical signal having a different wavelength. Furthermore, the dispersion compensator is characterized in that it satisfies the following relationship;

$$wx \geq wp,$$

where a beam radius wx is defined as a distance at which an optical intensity of monochromatic light is $1/e^2$ of a peak value on the spatial light modulator plane, and wp is a repetitive distance of the pixel.

Preferably, according to the dispersion compensator of the present invention, the dispersive element may be adapted such that on the first dispersion axis of the spatial light modulator, a light beam emitted from the dispersive element has an electric field distribution of a beam of a sinc function shape when the light beam is focused with the focusing lens.

Furthermore, the dispersion compensator further includes an optical tap having an output connected to an input of the dispersion compensator, and a wavelength demultiplexer having an input connected to an output of the dispersion compensator. In a network, the optical tap and the wavelength demultiplexer can be integrated with each other, thereby facilitating the maintenance of the network system and the optical signal processor.

As described above, according to the dispersion compensator of the present invention, existing general-purpose low-cost optical components can be combined to construct a relatively simple free space optical system. This structure allows for implementing a dispersion compensator to which flexible dispersion characteristics can be set in the case of a system change. The dispersion compensator features a reduced size, high flexibility of setting dispersion characteristics, and improved manufacturability. Even when WDM wavelengths are relocated due to changes in system operation, it is possible to change the system configuration in a flexible manner and facilitate its maintenance.

BRIEF DESCRIPTION OF THE DRAWINGS

FIG. 20 is a table showing some types of diffraction gratings commonly available and their examples of angular dispersion;

FIG. 24 is a view showing the types of dispersion compensators classified in terms of the network pattern and the transmission rate;

BEST MODE FOR CARRYING OUT THE INVENTION

Now, the present invention will be explained below in more detail with reference to the accompanying drawings in accordance with the embodiments. In addition, throughout the explanatory figures for the embodiments of the present invention, those components having the same function are denoted with the same symbols without being explained repeatedly.

A dispersion compensator of the present invention is characterized in that general-purpose optical components including a spatial light modulator for imparting discrete phases are used to establish an appropriate relationship between the focusing beam radius and the pixel of the spatial light modulator, thereby providing various dispersion compensation characteristics. With attention being focused on the correspondence between a plurality of pixels on the spatial light modulator for providing discrete phase shifts and communication channels, it is possible to flexibly change dispersion characteristics and implement the independent setting of dispersion values for each WDM wavelength.

First Embodiment

Figure 1A:
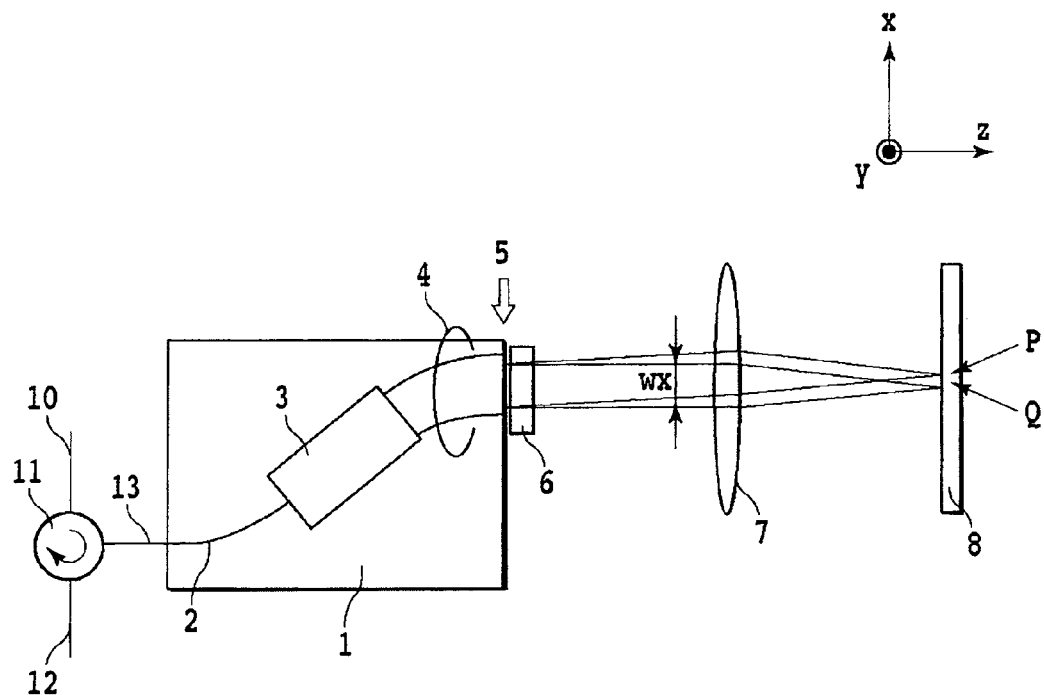
FIG. 1A is a top view illustrating the configuration of a dispersion compensator according to a first embodiment of the present invention.
Figure 1B:
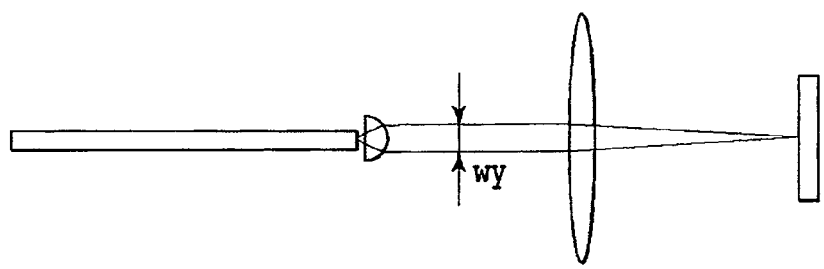
FIG. 1B is a side view illustrating the configuration of the dispersion compensator according to the first embodiment of the present invention.

FIGS. 1A and 1B are views illustrating the configuration of a dispersion compensator according to a first embodiment of the present invention. FIG. 1A is a top view (an x-z plane) of an AWG substrate, while FIG. 1B is a side view (a y-z plane) thereof. The dispersion compensator according to the present invention is made up of a circulator 11 for input/output of optical signals; and a free space optical system which includes an arrayed-waveguide grating 1 (hereinafter referred to as AWG), a cylindrical lens 6, a focusing lens 7, and a spatial light modulator 8. The dispersion compensator includes a so-called reflective optical signal processing system in which an input optical signal is reflected upon the spatial light modulator 8 and the optical signal is delivered via the same AWG 1. The spatial light modulator implements the dispersion compensator unique to the present invention.

In more detail, an optical signal coming through an input fiber 10 is incident upon an input waveguide 2 of the AWG 1 via the circulator 11 and a coupling fiber 13. The optical signal incident upon the input waveguide 2 propagates to an arrayed waveguide 4 via a slab waveguide 3. The arrayed waveguide 4 is made up of a plurality of waveguides, where adjacent waveguides have a path-length difference dL. In the arrayed waveguide 4, optical signals having different wavelengths are spatially dispersed. That is, in the x-z plane (dispersion plane), an optical signal emitted from a facet 5 propagates towards the focusing lens 7 in the direction of the z-axis at a different dispersing angle θ corresponding to its wavelength.

The optical signal emitted from the facet 5 is converted by the cylindrical lens 6 into a collimated beam of a width Wy in the direction of thickness of the AWG substrate, i.e., in the direction of y. On the other hand, in the direction of x within the x-z plane including the AWG substrate, the optical signal is converted through the lens effects of the slab waveguide 3 into a collimated beam having a sufficiently wide width Wx. That is, at the time at which the optical signal from the AWG 1 is emitted from the facet 5, the optical signal can be considered as a collimated beam within the x-z plane. The optical signal passing through the cylindrical lens 6 can be considered as a collimated beam both in the direction of x and in the direction of y.

The optical signal is turned into a converged beam through the focusing lens 7 to be focused on the spatial light modulator 8. The linear dispersion effects of the AWG 1 will cause the focusing position on the spatial light modulator 8 to vary depending on the wavelength. For example, depending on the wavelength of the optical signal, it is focused on Point P or Point Q. As will be described later, the spatial light modulator 8 unique to the present invention is adapted to set a desired amount of phase to an optical signal at each wavelength. The optical signal is reflected on a mirror corresponding to each pixel arranged within the spatial light modulator 8. The reflected optical signal propagates back along the z-axis towards an input port 2 through the same optical path as the incoming path. The optical signal is then delivered from an output fiber 12 via the coupling fiber 13 and the circulator 11.

According to the present invention, a phase distribution provided for the spatial light modulator 8 determines the behavior as the dispersion compensator. The spatial light modulator 8 is given, for example, a second-order phase distribution expressed by the following equation. That is, the phase distribution φ(u) is expressed by the following equation;

$$\phi(u) = k2 \times u^2 \text{(rad)} \qquad \text{Equation (1),}$$

where u is the coordinate on the u-axis along the intersecting line between the spatial light modulator 8 and the dispersion plane; k2 is a coefficient which can be varied to change the amount of dispersion imparted to the input optical signal.

Figure 2:
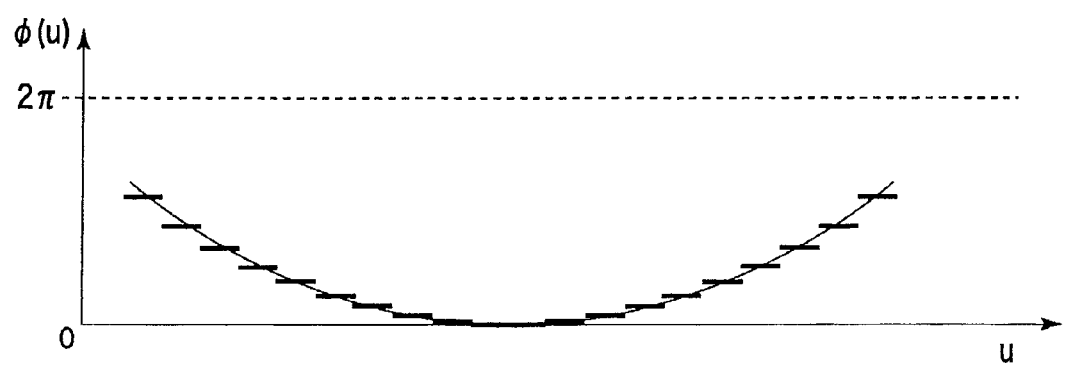
FIG. 2 is a view illustrating an example of a phase distribution provided for the spatial light modulator of the present invention.

FIG. 2 is a view illustrating an example of phase distribution provided for the spatial light modulator. On the spatial light modulator 8, element components, i.e., pixels are discretely arranged in the direction of the u-axis. The distribution of phase values given by the pixels is discrete. Accordingly, the phase of the ith pixel is represented by the amount of φ(ui) at the center coordinate ui. For example, the amount of phase setting given by the MEMS phase modulation device has a stepwise distribution as shown in FIG. 2. Note that with FIG. 1A, FIG. 1B, and FIG. 2 being associated all together, the x-axis of FIG. 1A corresponds to the u-axis of FIG. 2.

It is assumed here that on the spatial light modulator 8, the pixel array is distributed only in the direction of the u-axis. However, the pixel array may also be arranged so that it is distributed in the direction of the v-axis orthogonal to the u-axis. That is, the pixels on the spatial light modulator 8 can also be arranged in a two-dimensional array. In the case of this phase setting, as with a third embodiment to be described later, the transmission band can be expanded. Furthermore, in the aforementioned two-dimensional array structure, the two array axes may not necessarily be perfectly orthogonal to each other.

Figure 3:
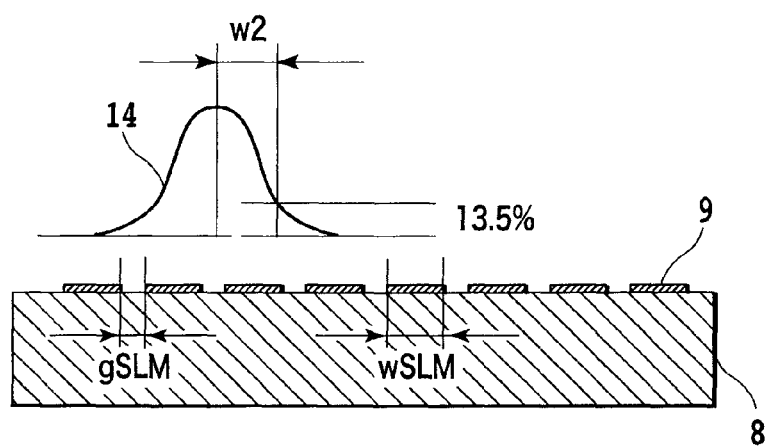
FIG. 3 is an explanatory view illustrating the relationship between the pixel and the focusing spot of the spatial light modulator of the present invention.

FIG. 3 is an explanatory view illustrating the relationship between the pixel and the focusing spot on the spatial light modulator. As shown in FIG. 3, the pixel size may be preferably determined to satisfy the relationship of the following equations;

$$w2 \geq wSLM \qquad \text{Equation (2), and}$$

$$w2 \geq gSLM \qquad \text{Equation (3),}$$

where w2 is a radius at which the optical intensity of a monochromatic light focusing spot 14 on the spatial light modulator 8 is $1/e^2$, i.e., 13.5% of the peak optical intensity; wSLM is the width of a pixel 9 of the spatial light modulator; and gSLM is a gap between adjacent pixels.

Suppose that the relationships given by Equations (2) and (3) are not satisfied, and w2 is less than wSLM or gSLM. In this case, the phase value given by the pixel 9 is discrete, and the phase value is abruptly varied near the boundary between adjacent pixels 9. Accordingly, the phase provided for the optical signal by the spatial light modulator 8 is also abruptly varied, causing some ripples to occur in the transmitted spectrum and the amount of dispersion setting of the dispersion compensator.

In contrast to this, the relationship between w2 and wSLM or gSLM may be set to satisfy Equations (2) and (3). In this case, even when the position of the focusing spot 14 is varied continuously, the discontinuity of the phase given by the pixel 9 will disappear. Even when each pixel has a discrete phase value, the dispersion compensator can provide smooth dispersion compensation characteristics.

Figure 4:
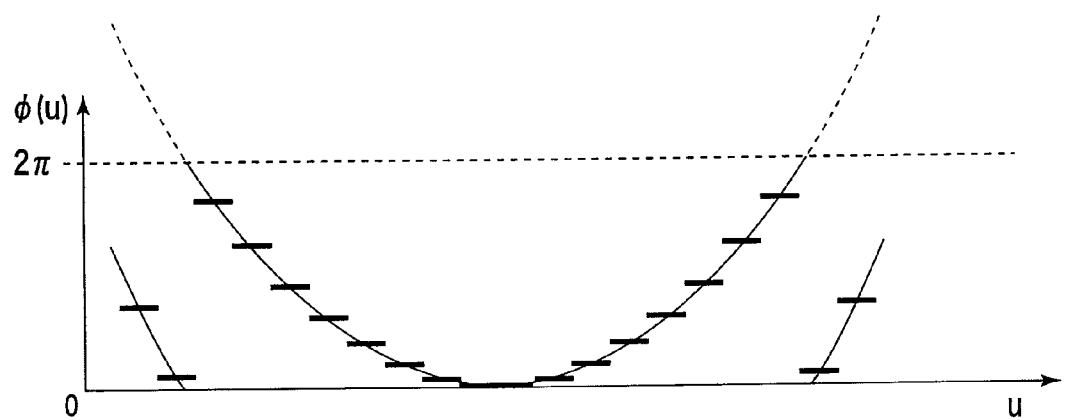
FIG. 4 is a view illustrating another example of a phase distribution provided for the spatial light modulator.

FIG. 4 is a view illustrating another example of a phase distribution provided for the spatial light modulator. In general, the phase that can be set for each pixel of the spatial light modulator 8 has a finite value. To address this restriction, the inventors found that, as shown in FIG. 4, it is only necessary to turn back (repeat) actual phase values at position "u" where the desired phase value exceeds 2π. That is, when the desired phase value is 2π or greater, the remainder obtained by dividing the phase value by 27π can be set as the actual phase value. Using a discrete phase value for each pixel and by turning back (repeating) the phase values greater than 2π, it is possible to set any desired phase characteristic on all of the pixels of the spatial light modulator 8.

What is critical to the characteristics of the dispersion compensator is that ripples are small with the dependency of dispersion on wavelength. Concerning the magnitude of ripples, it is said that a variation in amplitude value with the dependency of phase on wavelength has the strongest correlation with a bit error in transmitting an optical signal (refer to Non-Patent Document 3). As shown in FIG. 4, the dispersion compensator of this embodiment directly controls the wavelength-dependency of the phase to beset. Accordingly, some ripples may occur additionally to the chromatic dispersion characteristics in the dispersion compensator itself or due to some external disturbance. Even in this case, the wavelength-dependency of the phase to be set (i.e., the ripple) can be directly controlled, thereby eliminating the ripples in principle.

Now, some instances of specific design numerals and parameters for the configuration of the first embodiment will be shown below. The spatial light modulator 8 used here is an electrostatically driven MEMS spatial light modulator which is used in a projector or the like. The MEMS spatial light modulator used in this embodiment has a mirror or a pixel of a width wSLM of 5.5 μm, with a gap gSLM between mirrors being 0.3 μm, and a total number of 512 mirrors.

The arrayed-waveguide grating was formed of silica-based optical waveguides of a relative index difference of 1.5%. Here, the path-length difference of the arrayed waveguide was set to 4.1 mm, the arrayed waveguide pitch at the facet 5 of the arrayed waveguide to 10 μm, the numerical aperture of the emitted light in the direction of thickness of the AWG substrate at the facet to 0.2, the free spectral range (FSR) to 50 GHz. The FSR can be set corresponding to the wavelength interval of the ITU grid, thereby setting a phase distribution provided by all the pixels corresponding to an optical signal placed (allotted) within one channel of the ITU grid. As well known to those skilled in the art, when setting the FSR to 50 GHz as described above, each of coherent light beams of adjacent different diffraction orders in the AWG corresponds respectively to adjacent channels of the ITU grid. Note that using the different diffraction order interference gives the same dispersion compensation characteristics to each of the plurality of channels. This is the feature that cannot be implemented by the bulk-type diffraction grating which uses only lower diffraction orders.

Using the AWG as in this embodiment makes it possible to implement a flexible optical design that the bulk diffraction grating cannot offer, thus realizing good optical characteristics. For example, the bulk diffraction grating uses those orders as low as one to two, whereas the arrayed-waveguide grating can adopt higher orders from a few tens to several thousand orders due to its design flexibility. It is thus possible to set higher dispersion values.

The focus distance of the focusing lens 7 was set to 16 mm, and the focus distance of the cylindrical lens 6 was set to 1 mm. As a result of setting the design values and parameters as described above, the optical frequency included in one diffraction order is distributed over the 512 mirrors of the MEMS spatial light modulator. It is thus possible to make effective use of all the mirrors (pixels) of the MEMS phase modulation device without any waste.

Figure 5A:
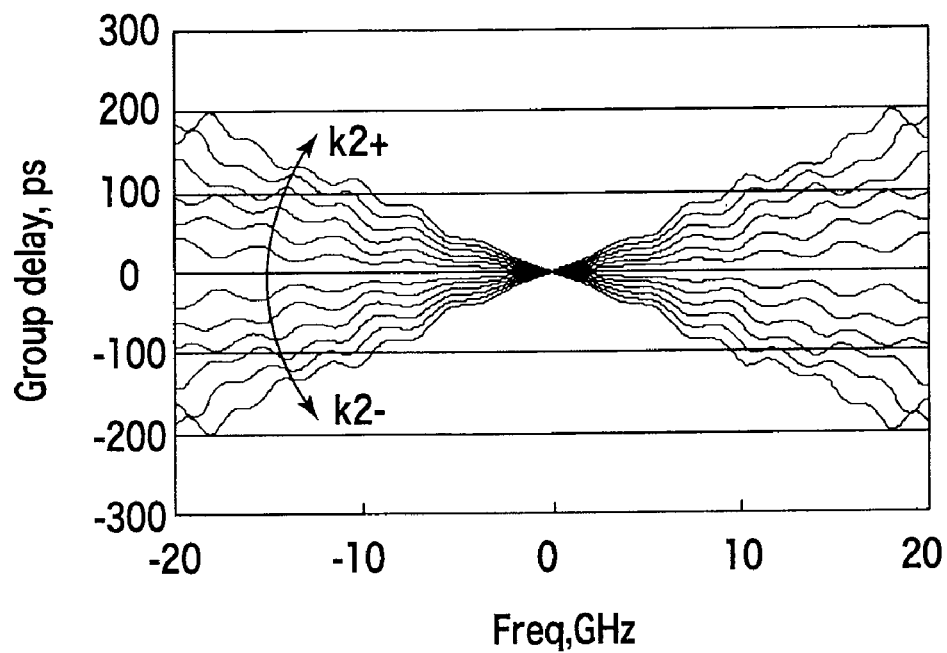
FIG. 5A is a view illustrating the amount of group delay with k2 being varied according to the dispersion compensator of the present invention.
Figure 5B:
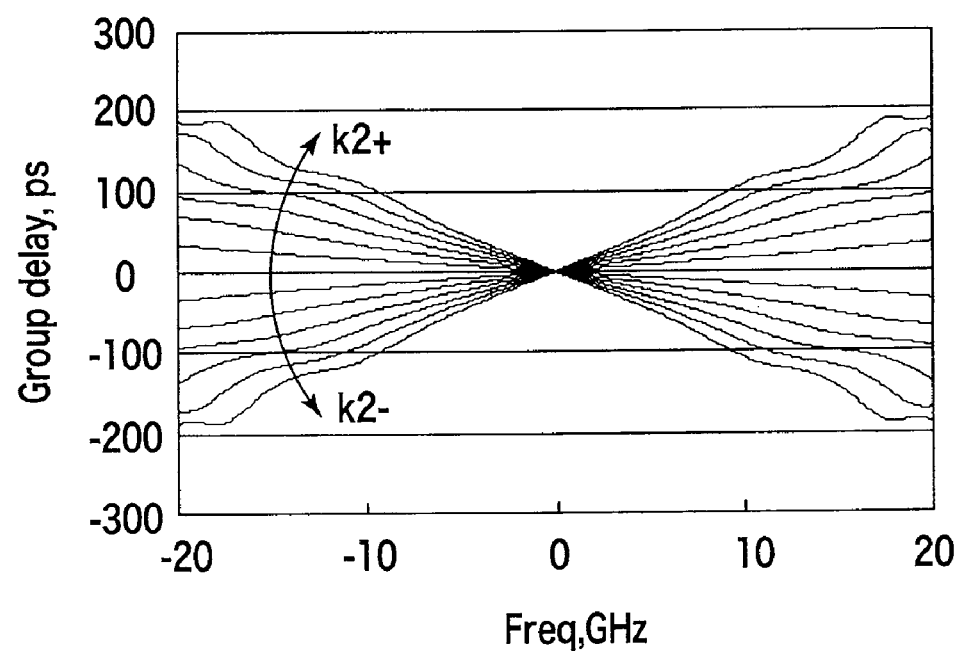
FIG. 5B is another view illustrating the amount of group delay with k2 being varied according to the dispersion compensator of the present invention.

FIGS. 5A and 5B are views illustrating the amount of group delay according to the dispersion compensator of the present invention with k2 as a parameter. FIG. 5A shows the group delay characteristics by the dispersion compensator when the beam width w2 is 0.5 times the width wSLM of the MEMS mirror. FIG. 5B shows the group delay characteristics of the dispersion compensator when the beam width w2 is one time (or equal to) the width wSLM of the MEMS mirror. Each of the figures shows the respective amounts of group delay when the coefficient k2 of Equation (1) was varied from $-1.2 \times 10^{-5}$ to $-1.2 \times 10^{-5}$ at intervals of $2.0 \times 10^{-6}$. The horizontal axis represents a relative optical frequency of one channel. For example, taking the DWDM grid with ITU G.694.1 standards as an example, the center optical frequency 0 Hz in FIGS. 5A and 5B can be associated with 193.1 THz.

Since the case shown in FIG. 5A does not satisfy the relationship of Equation (2) for the beam radius and the pixel width, there occurred some ripples in the group delay characteristics. The group delay given by the dispersion compensator would instead deteriorate the flatness of the transmission characteristics of the entire system. On the other hand, in the case of FIG. 5B, the beam radius and the pixel width satisfy the relationship of Equation (2), providing good group delay characteristics with reduced ripples. It is thus possible for the dispersion compensator to provide the good group delay compensation characteristics by setting the relationship between the beam radius w2 and the pixel size to satisfy Equations (2) and (3).

Second Embodiment

Figure 6:
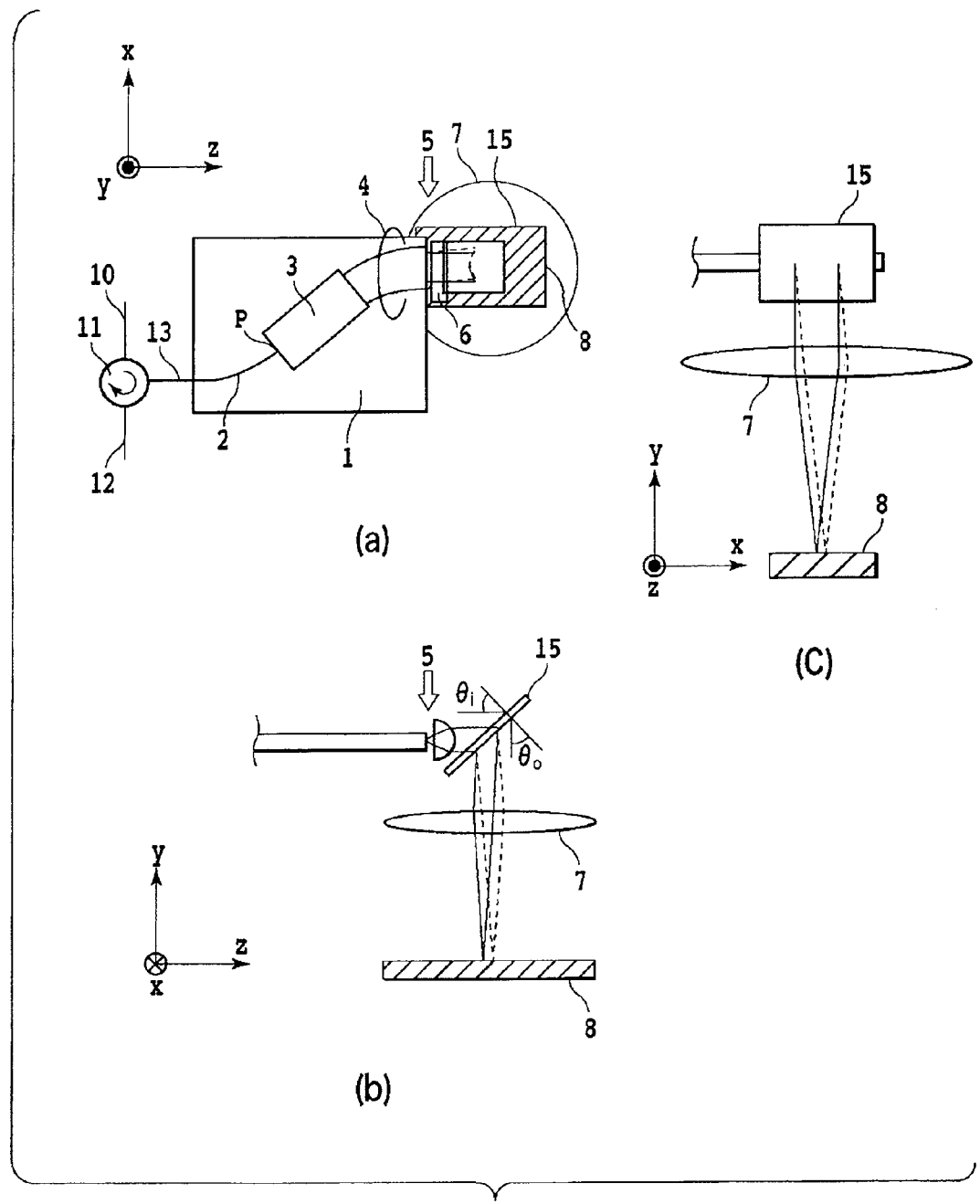
FIG. 6 is a view illustrating the configuration of a dispersion compensator according to a second embodiment of the present invention.

FIG. 6 is a view illustrating the configuration of the dispersion compensator according to a second embodiment of the present invention. This dispersion compensator is also of the same reflection type as that of the first embodiment, but different therefrom in that a bulk-type diffraction grating 15 is further included, and an optical signal is spatially dispersed using a bulk-type diffraction grating. Furthermore, a key feature of this embodiment lies in that when viewed through an optical path, the AWG and the dispersion plane of the bulk-type diffraction grating are orthogonal to each other. Now, the differences between the second and first embodiments will be described in detail below.

As with the first embodiment, an optical signal supplied through the input fiber 10 is incident upon the input waveguide 2 of the AWG 1 via the circulator 11 and the coupling fiber 13. The optical signal incident upon the input waveguide 2 propagates to the arrayed waveguide 4 via the slab waveguide 3. The arrayed waveguide 4 is made up of a plurality of waveguides, where adjacent waveguides have a path-length difference dL. In the arrayed waveguide 4, optical signals having different wavelengths are spatially dispersed. That is, in the x-z plane (dispersion plane), an optical signal emitted from the facet 5 propagates towards the bulk-type diffraction grating 15 in the direction of the z-axis at a different dispersing angle θ corresponding to its wavelength.

The optical signal emitted from the facet 5 is converted by the cylindrical lens 6 into a collimated beam in the direction of thickness of the AWG substrate, i.e., in the direction of y. The optical signal emitted from the cylindrical lens 6 can be considered as a collimated beam within the y-z plane. On the other hand, in the direction of x within the AWG substrate plane, the optical signal is converted through the lens effects of the slab waveguide 3 into a sufficiently wide collimated beam. That is, at the time at which the optical signal from the AWG 1 is emitted from the facet 5, the optical signal can be considered as a collimated beam within the x-z plane. The optical signal passing through the cylindrical lens 6 can be considered as a collimated beam both in the direction of x and in the direction of y.

The configuration of the second embodiment is characterized by including a bulk-type diffraction grating for further spatially dispersing the optical signal that has been spatially dispersed through the AWG 1. The optical signal emitted from the cylindrical lens 6 is further spatially dispersed by the bulk-type diffraction grating 15 whose normal is tilted by θi relative to the z-axis with the grid being oriented in the direction of the x-axis. The optical signal spatially dispersed through the bulk-type diffraction grating 15 is focused on the spatial light modulator 8 by the focusing lens 7. Here, the direction of dispersion of the AWG 1 and the direction of dispersion of the bulk-type diffraction grating 15 are related to each other in a manner such that when the respective dispersion planes are viewed along the optical path, the two dispersion planes are orthogonal to each other.

In FIG. 6(b), the AWG 1 and the spatial light modulator 8 are shown as being disposed parallel to each other, however, strictly speaking, they are not parallel to each other. FIG. 6 shows an exemplary case where a particular bulk-type diffraction grating to be discussed later will be used with an incident angle θi of 46.76 degrees. At this time, the optical path is refracted substantially at 90 degrees with the bulk-type diffraction grating. Thus, in the drawings, the AWG and spatial light modulator are represented as if they are disposed to be parallel to each other. Accordingly, in this embodiment, there is no restriction to the refracting angle θi of the bulk-type diffraction grating. In this embodiment, when viewed along the optical path, the dispersion plane of the AWG 1 and the dispersion plane of the bulk-type diffraction grating 15 are relatively orthogonal to each other. This provides a feature that the pixels of the spatial light modulator can be disposed two-dimensionally with anisotropy.

Now, description will be made for the relationship between the wavelength (optical frequency) and the position of a focused beam of an optical signal. For this purpose, the wavelength is virtually continuously varied to consider the locus that the focused beam draws on the spatial light modulator. In this embodiment, the angular dispersion of the AWG 1 is set to be sufficiently larger than the angular dispersion of the bulk-type diffraction grating 15, thereby allowing the focused beam on the spatial light modulator 8 to be raster scanned depending on the wavelength of the optical signal.

For example, the diffraction order of the bulk-type diffraction grating 15 may be set to one, while the FSR of the AWG 1 may be set to be equal to the grid interval of a WDM signal of the communication system in question. Such raster scanning of beams can be realized using an AWG as a first dispersive element which permits high flexibility in design parameters and implements a desired FSR in a simple manner. With the bulk-type diffraction grating used as the first dispersive element, the angular dispersion cannot be set to a desired value in a simple manner. It should be noted that the dispersion characteristics of the first dispersive element and the dispersion characteristic of the second dispersive element are assigned an appropriate angular dispersion and then combined, thereby realizing the dispersion compensator capability unique to this embodiment. As in the first embodiment, the optical signal reflected on the spatial light modulator 8 is reversed in its optical path to propagate back through the incoming path. Then, the optical signal will be emitted from the output fiber 12 via the circulator 11.

Figure 7:
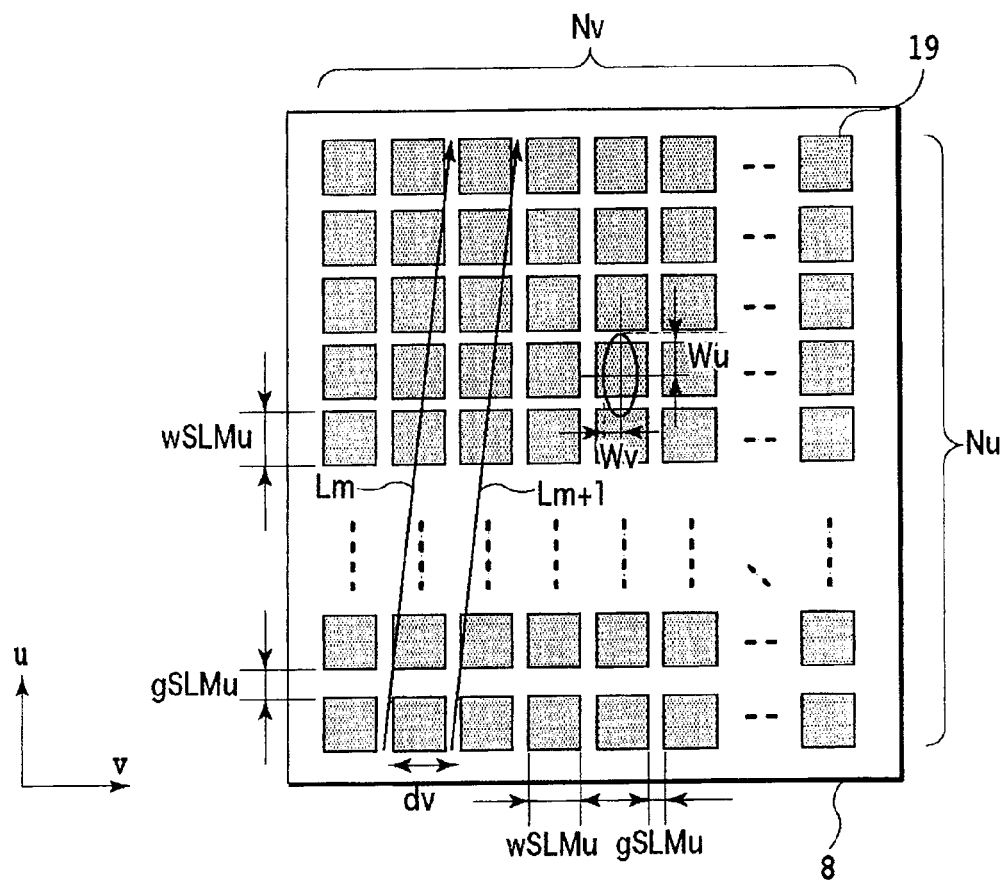
FIG. 7 is a view illustrating the relationship between the focusing spot size and the pixel of the spatial light modulator suitable for the dispersion compensator of the second embodiment.

FIG. 7 is a view illustrating the configuration of a spatial light modulator which is suitable for the dispersion compensator of the second embodiment. Here, the coordinates system of the spatial light modulator 8 is defined as the u-axis and the v-axis as shown in FIG. 7. As described above, the FSR of the AWG 1 is set to be equal to the grid interval of the WDM signal in the communication system in question. At this time, an optical signal within one channel corresponding to a grid is associated with an interference light beam of a certain diffraction order in the AWG 1. Accordingly, assuming that the wavelength of a virtually unmodulated optical signal is continuously varied, the position of a focused beam due to the dispersion effects of the AWG 1 draws a locus on a line segment Lm in the case of an optical signal of a diffraction order of m.

For example, the optical signal of a diffraction order m corresponds to an optical signal in the mth specific channel. Likewise, the optical signal of a diffraction order m+1 draws an adjacent Lm+1 locus. The optical signal of a diffraction order m+1 corresponds to an optical signal in the (m+1)th channel adjacent to the mth channel. Accordingly, an optical signal component present within one communication channel has a correspondence with a pixel array locally present on one locus line Lm scanned over the spatial light modulator 8. In other words, an optical signal within one channel is provided with a phase and compensated for dispersion by a pixel array localized on one locus Lm and arranged in the direction of the u-axis.

The technique of setting a phase in the direction of the u-axis, which was explained in the first embodiment, can be applied to a pixel array present on the locus Lm and arranged in the direction of the u-axis, thereby setting dispersion characteristics (group delay characteristics) that are different from communication channel to communication channel. That is, this embodiment is characterized in that different independent phase distributions can be set for each pixel array, thereby setting different dispersion characteristics (group delay characteristics) for each channel. Here, assuming that wSLMv is the pixel width in the direction of v and gSLMv is the pixel gap, the pixel pitch (wSLMv+gSLMv) in the direction of v on the spatial light modulator 8 is made equal to the distance dv between the Lm locus and the Lm+1 locus in the direction of the v-axis. Note that in a specific embodiment where the optical path shown in FIG. 6 has a refraction of about 90 degrees, the direction of the v-axis is generally close to the direction of the z-axis, however, the z-axis and the v-axis do not always agree with each other. It is to be understood that the v-axis specifies the position of a pixel within the spatial light modulator in relationship to the u-axis and is orthogonal to the u-axis.

Referring to FIG. 7, the relationship between the focused beam radius and the pixel structure along the u-axis and the v-axis will be further considered. Here, FIG. 7 shows each pixel as a square for simplicity, however, it should be noted that in each of the u-axis and the v-axis, attention is focused on the relative relationship between the focusing spot beam radius and the pixel size (width and gap) to explain the method for setting a phase. On the other hand, the shape of a focused beam corresponding to an unmodulated optical signal at an optical frequency (wavelength) is generally elliptical according to the characteristics of the focusing lens and the cylindrical lens. Here, it is assumed that the pixel width in the direction of u on the spatial light modulator 8 is wSLMu, and the pixel width in the direction of v is wSLMv; concerning the focusing spot, the ellipse radius in the direction of u is wu, and the ellipse radius in the direction of v is wv. Each ellipse radius is defined as the radius at which in the respective u-axis and v-axis, the peak optical intensity of the focusing spot is $1/e^2$, that is, 13.5% of the peak optical intensity.

As with the first embodiment, all that is required to reduce the ripple in the dispersion value within a channel is to satisfy the following equation in the direction of the u-axis;

$$wu \geq wSLMu \qquad \text{Equation (4).}$$

In the direction of v, the focusing spot raster that draws the locus Lm moves by dv for each optical frequency corresponding to the FSR of the arrayed-waveguide grating in accordance with the angular dispersion of the bulk-type diffraction grating 15. Accordingly, in terms of the ellipse radius in the direction of v of a focusing spot, overlapping of beams in adjacent channels can be eliminated by satisfying the following equation;

$$wv \leq wSLMv/2 \qquad \text{Equation (5).}$$

Since the ellipse radius wv in the direction of v is a radius at which the optical intensity of a focusing spot is $1/e^2$ of the peak value, beam overlapping can be eliminated by satisfying the condition given by Equation (5). Satisfying the condition given by Equation (5) makes it possible to implement a crosstalk performance of −30 dB or less that is a general requirement of optical communications.

In the direction of v, the focused beam corresponding to an optical signal having a wavelength component at an end portion of one communication channel may reach the end portion of a pixel and fall out of the pixel area. It may be thus impossible to provide a desired phase characteristic to the dispersion compensator. However, a modulated optical signal at the end portion of communication channel wavelengths has a very low optical intensity level, and is usually substantially out of the modulation band of an optical signal. Accordingly, in the communication system, the wavelength component of a modulated optical signal at this wavelength end portion contributes virtually nothing to transmission of information on the optical signal. Accordingly, even when the focused beam reaches the end portion of the pixel and falls out of the pixel, the deterioration in communication quality can be neglected.

To implement the dispersion compensator of this embodiment, the parameter of each component may be set as follows. The arrayed-waveguide grating 1 was fabricated using silica-based optical waveguides having a relative index difference of 1.5%. The path-length difference of the arrayed waveguide was set to 2.05 mm, and the arrayed waveguide pitch of the arrayed waveguide at the facet 5 to 10 μm. Additionally, the numerical aperture in the direction of substrate thickness at the facet was set to 0.2, the FSR to 100 GHz, and the focusing spot size wu in the direction of u on the spatial light modulator 8 to 20 μm. Furthermore, the focus distance of the cylindrical lens 6 is set to 12 mm and the focus distance of the focusing lens 7 to 30 mm.

As the spatial light modulator, it is possible to use an LCOS (Liquid Crystal on Silicon) device or a general-purpose phase modulation device incorporated into displays or the like. On the LCOS, there are microscopic pixels which are two-dimensionally arranged for shifting phases. The LCOS used in this embodiment is configured to have its pixel size with wSLMu=5.5 μm, gSLMu=0.3 μm, wSLMv=34.7 μm, and gSLMu=0.3 μm, and the number of pixels Nu=1080 in the direction of u and the number of pixels Nv=1920 in the direction of v.

The bulk-type diffraction grating 15 used was, for example, a VPHG (Volume Phase Holographic Grating) having a groove period of 9401/mm. The bulk-type diffraction grating 15 is not limited to the VPHG type, it is also possible to use other gratings such as the transmissive blazed diffraction grating, the reflection holographic diffraction grating, or the reflective blazed diffraction grating in order to realize the same function that can be achieved with the VPHG. With the incident angle θi being 46.76 degrees, the VPHG with a groove period of 9401/mm has an angular dispersion of 1.37 mrad/nm. Accordingly, the position of the focusing spot on the LCOS moves in the direction of v by 35 μm per 100 GHz of the optical signal frequency. Under the aforementioned condition, the beam radius wv in the direction of v is 8 μm, which satisfies the condition of Equation (7).

Figure 8:
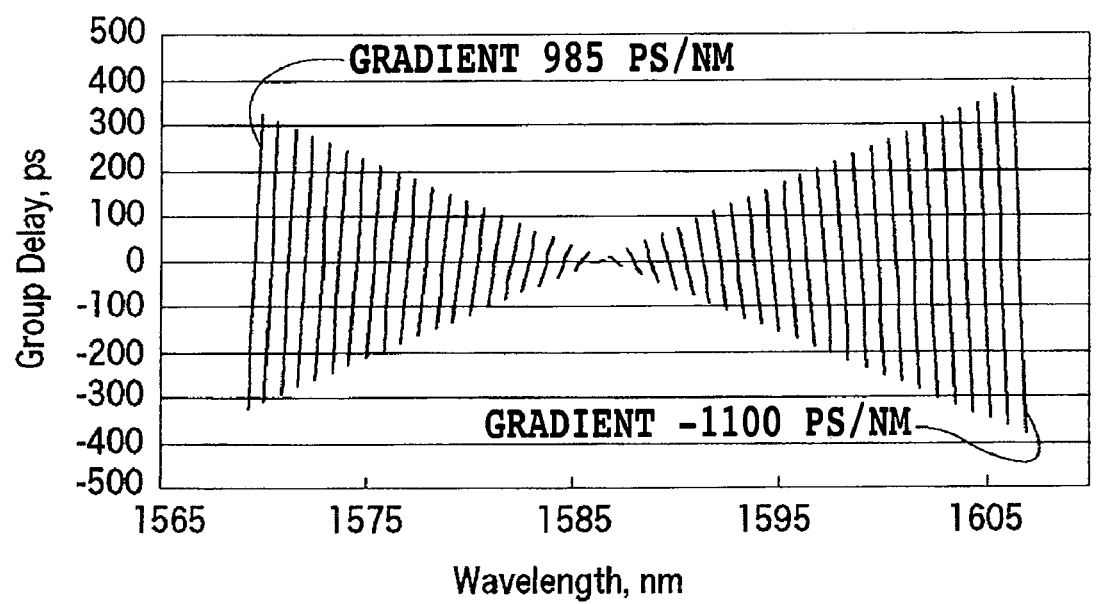
FIG. 8 is a view illustrating the group delay characteristics of the dispersion compensator of the second embodiment.

FIG. 8 is a view illustrating the group delay characteristics of the dispersion compensator according to the second embodiment. It shows the group delay time of 45 channels from the center frequency 191,000 GHz to 186,600 GHz. Each line segment shows the specified value of the group delay time for one channel. Those dispersion values from 985 ps/nm to −1100 ps/nm are individually set for each WDM channel. As can be seen from FIG. 8, a different group delay time is set for each channel, showing that a group delay can be independently set for each WDM channel.

As described in detail above, the dispersion compensator of the second embodiment can freely set an independent dispersion value for a plurality of communication channels. This allows for setting a different dispersion value for each WDM wavelength, which is required in a ring-mesh type network that uses the wavelength selective switch. Furthermore, since using the LCOS allows flexible phase distribution setting, this dispersion compensator has good flexibility and significantly improved adaptability when compared with the conventional techniques.

Third Embodiment

Now, description will be made for a dispersion compensator, according to an embodiment with pixels disposed in a different manner, which has a combination of the arrayed-waveguide grating 1 and the bulk-type diffraction grating 15 as with the second embodiment. In the second embodiment, as shown in Equation (5), the ellipse radius wv of a focusing spot in the direction of v was less than the pixel width wSLMv of the spatial light modulator. However, conversely, it is also possible to make the ellipse radius wv of the focusing spot in the direction of v greater than the pixel width wSLMv as shown in the following equation;

$$wSLMv \ll wv \qquad \text{Equation (6).}$$

Figure 9:
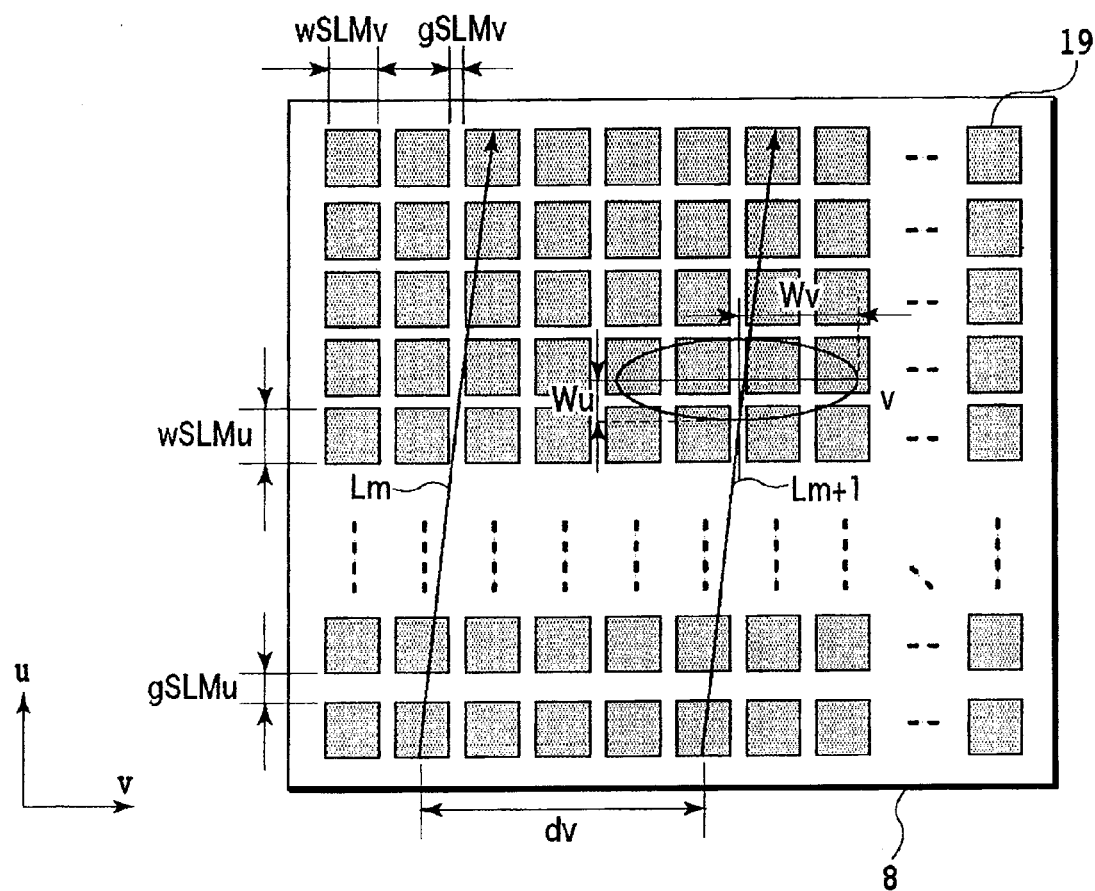
FIG. 9 is a view illustrating the relationship between the focusing spot size and the pixel on a spatial light modulator of a dispersion compensator according to a third embodiment.

FIG. 9 is a view illustrating the relationship between the focusing spot size and the pixel on the spatial light modulator of a dispersion compensator according to a third embodiment. In FIG. 9, pixels are configured such that the amount of shift dv of the focusing spot in the direction of v per one optical signal channel due to the angular dispersion of the bulk-type diffraction grating 15 corresponds to the width of multiple pixels of the spatial light modulator 8.

Figure 10:
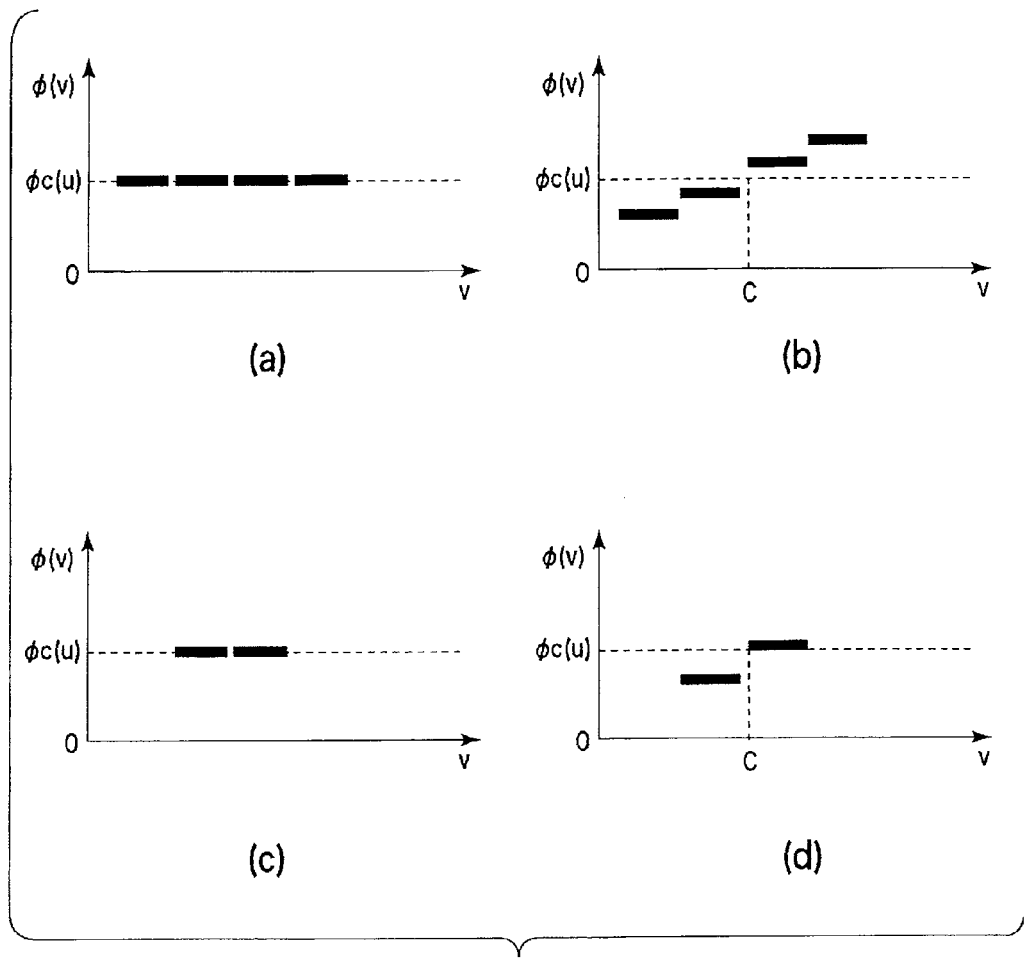
FIG. 10 is a view illustrating multiple examples of setting phases for each pixel on the v-axis of the spatial light modulator of the dispersion compensator according to the third embodiment.

FIG. 10 is a view illustrating an example of setting a phase for each pixel in the direction of the v-axis. When the phase is set to a constant value as shown in FIG. 10(*a*), the light wavefront reflected on the spatial light modulator 8 in the direction of the v-axis is the same as the light wavefront incident upon the spatial light modulator 8. Accordingly, the optical signal propagates back to the bulk-type diffraction grating 15 through the same optical path as the incoming path. The optical signal is then output to the output fiber 12.

On the other hand, when setting is made to have phase values tilted in the direction of the v-axis as shown in FIG. 10(*b*), the light wavefront of the optical signal reflected upon the spatial light modulator 8 is a wavefront that is tilted around the u-axis, i.e., the x-axis as the rotation axis. Even after having passed through the bulk-type diffraction grating 15, the light wavefront remains tilted with respect to the u-axis, i.e., the x-axis. As such, the optical signal reflected on the spatial light modulator 8 passes through an optical path different from the incoming path to propagate back to the AWG 1.

Furthermore, referring back to FIG. 6, the optical signal having passed through the bulk-type diffraction grating 15 is incident upon the AWG 1, at the facet 5 of the arrayed-waveguide grating, with an electric field distribution tilted with respect to the AWG waveguide unique mode in the direction of the y axis. Accordingly, it is possible to give a wavelength-dependent loss to the transmission characteristics of the dispersion compensator.

In each phase setting of FIGS. 10(*b*) and (*d*), the average value of each pixel phase weighted according to the optical power incident upon each pixel is set so as to be equal to a given amount of phase φc(u) on the u-axis determined from the amount of dispersion set as the dispersion compensator. For example, as shown in FIG. 10(*b*), it is possible to set the amount of phase at the center C on the v-axis to φc(u), and give, e.g., an odd-function-like phase distribution with point C at the origin. As such, this embodiment allows for independently setting the amount of dispersion imparted to the optical signal in accordance with the phase distribution in the direction of the u-axis and the loss imparted to the optical signal in accordance with the phase distribution in the direction of the v-axis. The phase setting in the direction of the v-axis is not limited to the odd function. Furthermore, the pixel to which the predetermined amount of phase φc(u) is set is not limited to a pixel near the center C on the v-axis, but may also be a pixel away from the center C.

Using two or more pixels will make it possible to form a tilted phase distribution as shown in FIGS. 10(*b*) and (*d*). Multiple pixels being used for phase control as in the arrangement shown in FIG. 10(*b*) would make it possible to diffract light with improved efficiency to impart loss thereto. Compare the arrangement (b) with the arrangement (d). The arrangement (d) is required to irradiate the center between two pixels with a light beam with improved accuracy. Also, unless the specified phase values of the two pixels are controlled accurately, it is difficult to ensure a sufficient extinction ratio. On the other hand, the arrangement (b) can afford a sufficient extinction ratio even when the position of the light beam is slightly deviated from the predetermined position.

In the case of the arrangement shown in FIG. 10(*d*), control can also be provided such that the amount of phase of one pixel is fixed on the v-axis while only the phase of the other pixel is varied. Accordingly, when compared with the arrangement shown in (b), simplified control can be advantageously provided to phase distributions in order to control the loss to be imparted. Furthermore, the arrangement shown in (d) is also advantageous from the viewpoints of yield rates and reliability because of its reduced number of pixels used and simplified structure.

In general, focusing attention on the amplitude of the input/output optical signal would show that the dispersion compensator serves as a bandpass filter. Here, those skilled in the art know the relationship that the product of a pass-band width B of a bandpass filter and a chromatic dispersion value D is constant. Accordingly, setting a higher chromatic dispersion value D would make the transmitted spectrum bandwidth smaller by that amount, with the tradeoff relationship present therebetween. Using the pixel arrangement of the third embodiment makes it possible for the dispersion compensator to expand the bandwidth B by imparting deliberately a new loss to a wavelength of a high amplitude transmittance.

Figure 11:
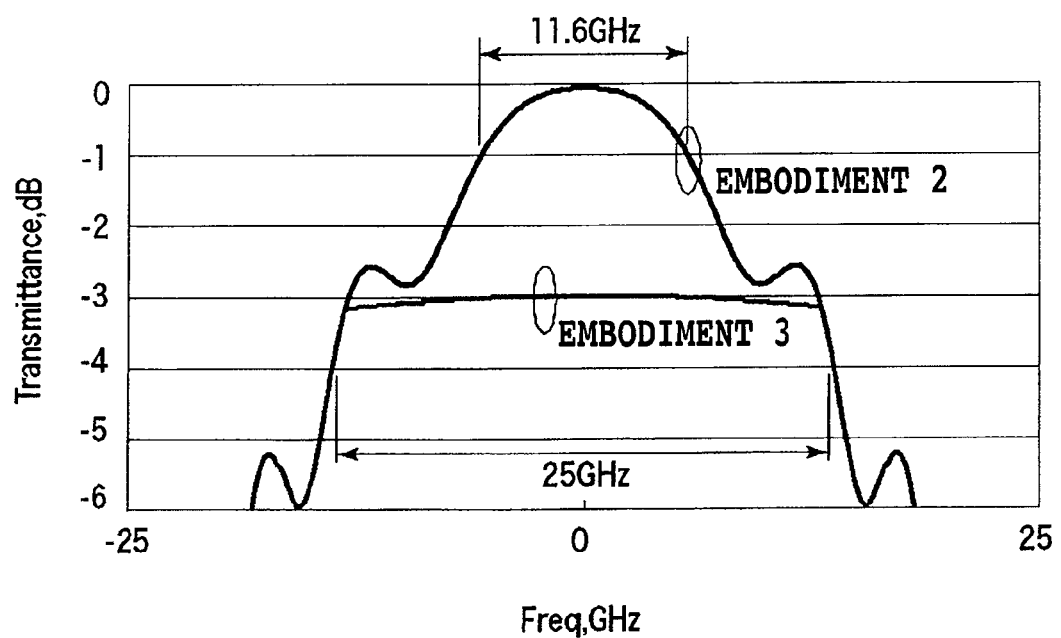
FIG. 11 is a view illustrating the transmission characteristics of the dispersion compensator of the third embodiment in comparison with that of the second embodiment.

FIG. 11 is a view illustrating the transmission characteristics of the dispersion compensator of the third embodiment in comparison with the second embodiment. In the third embodiment, the parameters used here other than those mentioned below are the AWG and the optical components having the same parameters as those of the second embodiment. In the third embodiment, the focus distance of the cylindrical lens 6 was set at 8 mm and the width wSLMv of the pixel on the spatial light modulator 8 in the direction of v was set at 5.5 μm. Accordingly, the LCOS of this embodiment is configured to have its pixel size with wSLMu=5.5 μm, gSLMu=0.3 μm, wSLMv=5.5 μm, and gSLMu=0.3 μm, and the number of pixels Nu=1080 in the direction of u and the number of pixels Nv=1920 in the direction of v. It should be noted that the focus distance of the cylindrical lens and the width of the pixel in the direction of v have been changed. The change made to the focus distance of the cylindrical lens caused the beam radius in the direction of v to be wv=12 μm. The beam radius in the direction of u is wu=8 μm as with the second embodiment.

FIG. 11 shows an amplitude transmission characteristic when the amount of chromatic dispersion is set to 1000 ps/nm at 188,900 GHz. FIG. 11 also shows the same dispersion value set to the dispersion compensator of the second embodiment for comparison purposes. In the case of the second embodiment, the width between two frequency-points in which the amount of 1-dB attenuation increases from the maximum transmittance, i.e., the 1-dB bandwidth is 11.6 GHz. In contrast to this, for the third embodiment, the 1-dB bandwidth is 25 GHz with the bandwidth B expanded twice or greater.

According to the dispersion compensator of the third embodiment, loss is actively imparted to an optical signal at an optical frequency with high transmittance to thereby expand the transmission band while the amplitude characteristic within a channel is flattened, thereby allowing for providing improved communication quality. Furthermore, the dispersion compensator of the third embodiment can provide an arbitrarily shaped transmitted spectrum and thus can operate as an optical intensity controller.

Figure 12:
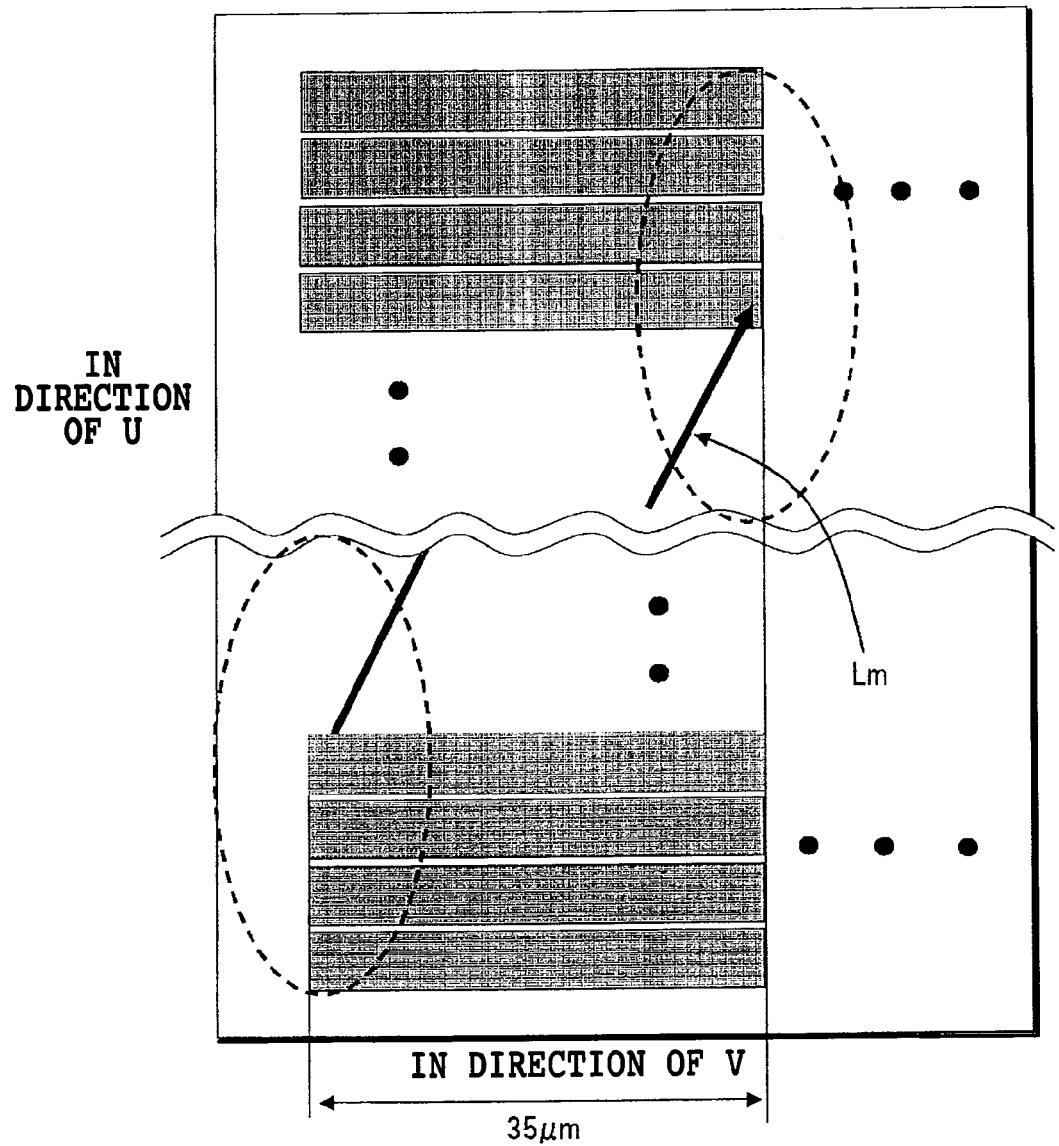
FIG. 12 is a view illustrating the relative actual-size relationship between the focusing spot size and the pixel size according to the second embodiment.
Figure 13:
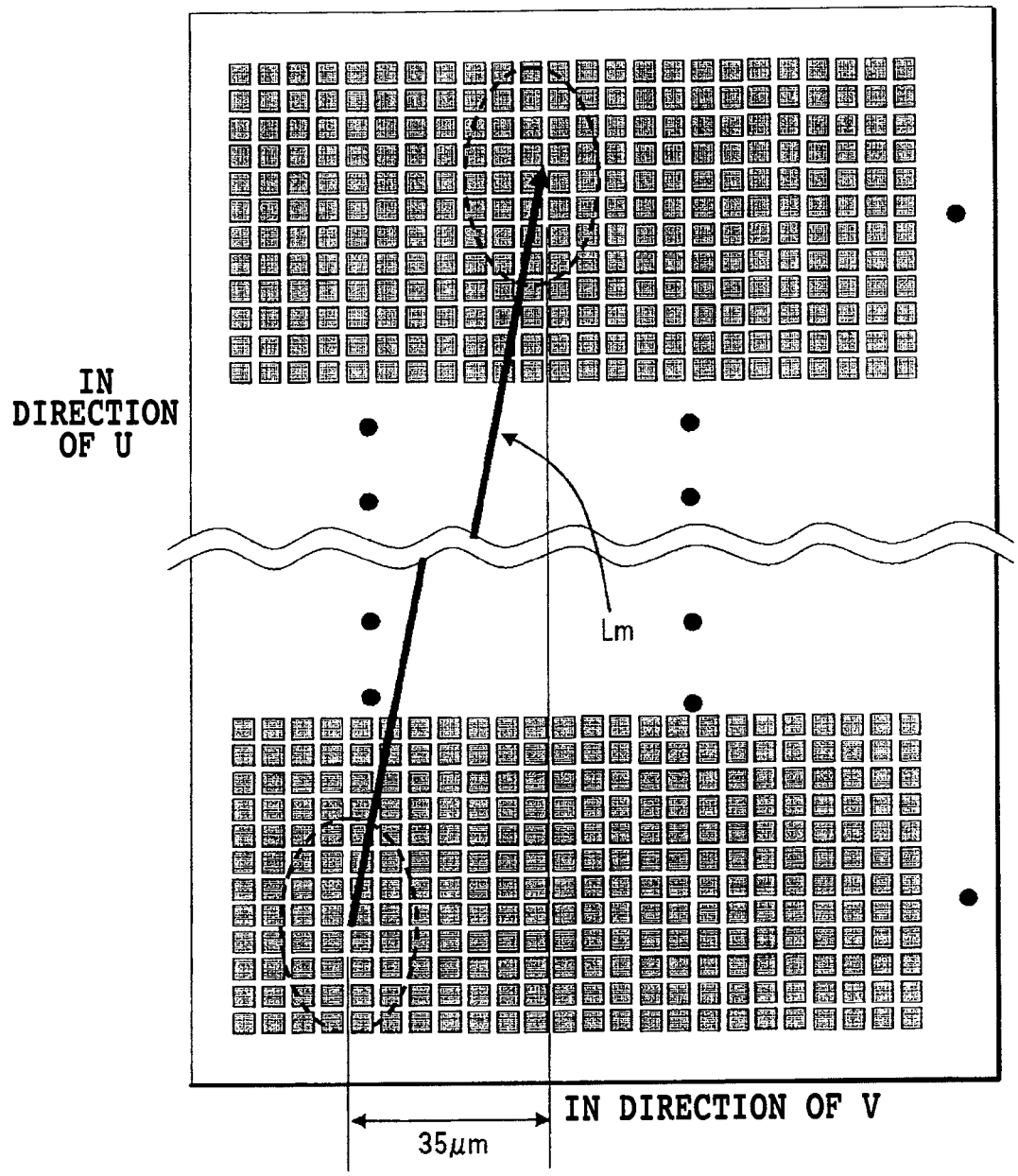
FIG. 13 is a view illustrating the relative actual-size relationship between the focusing spot size and the pixel size according to the third embodiment.

In the second and third embodiments described above, what is critical is the correlation between the focusing spot sizes in the directions of u and v and the pixel sizes, respectively. In FIGS. 7 and 9, both the correlations have been represented from generalized viewpoints. FIGS. 12 and 13 reflect the relative relationship between each actual size according to each of the aforementioned embodiments. FIG. 12 shows the actual-size relationship between the focusing spot size and the pixel size of the second embodiment. FIG. 13 also illustrates the actual-size relationship between the focusing spot size and the pixel size of the third embodiment.

Fourth Embodiment

The second and third embodiments described above use the LCOS as a spatial light modulator. In general, the liquid crystal phase modulation device has polarization dependence. Thus, to perform signal processing with a liquid crystal phase modulation device, it is necessary to align the polarization of incoming optical signals in the same direction. A fourth embodiment to be described below relates to an embodiment of a dispersion compensator which eliminates the polarization dependence.

Figure 14A:
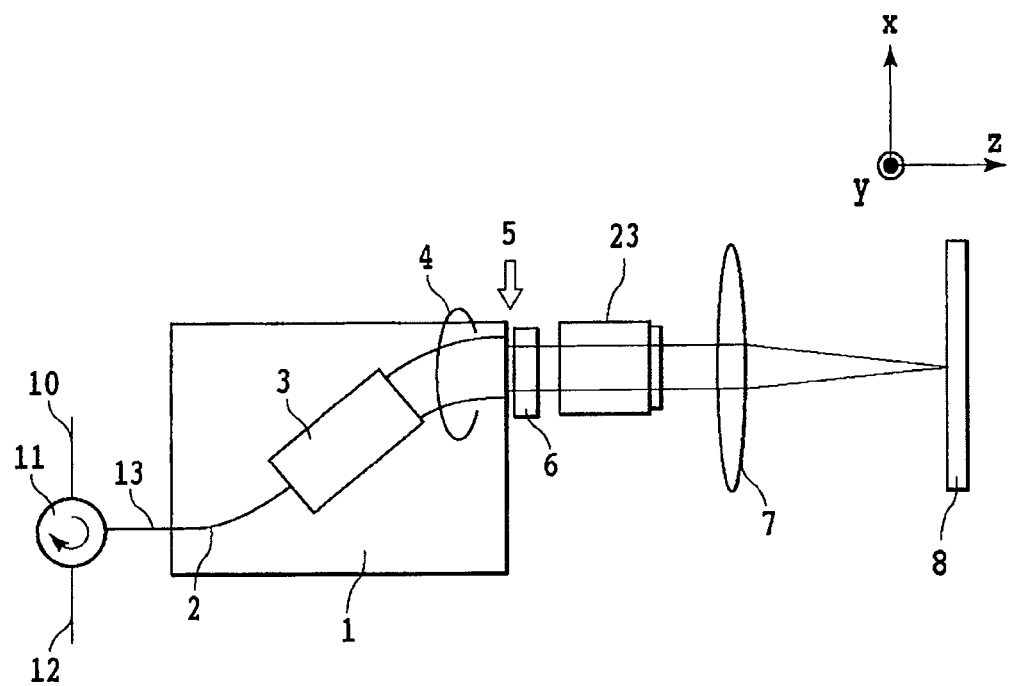
FIG. 14A is a top view illustrating the configuration of a dispersion compensator according to a fourth embodiment of the present invention.
Figure 14B:
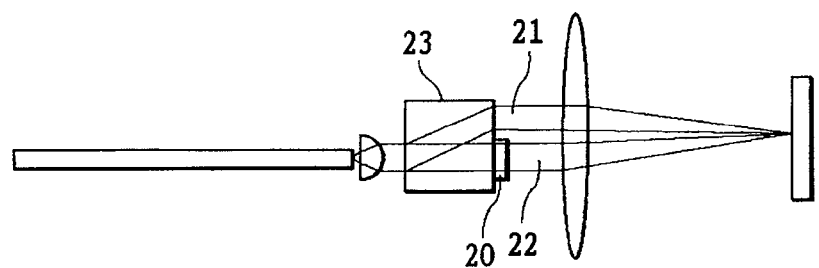
FIG. 14B is a side view illustrating the configuration of the dispersion compensator according to the fourth embodiment of the present invention.

FIGS. 14A and 14B are views illustrating the configuration of the dispersion compensator according to a fourth embodiment of the present invention. FIG. 14A is a top view (an x-z plane) of an AWG substrate, while FIG. 14B is a side view (a y-z plane) thereof. This dispersion compensator has the same reflective configuration as that of the first embodiment, but is different therefrom in that a polarization splitter and a half-wave plate are further included to eliminate the polarization dependence. Now, the differences between the configurations of the first and fourth embodiments will be explained below in detail.

As with the first embodiment, an optical signal coming through the input fiber 10 is incident upon the input waveguide 2 of the arrayed-waveguide grating 1 via the circulator 11 and the coupling fiber 13. Furthermore, the optical signal is emitted into free space via the slab waveguide 3, the arrayed waveguide 4, and the cylindrical lens 6. The emitted optical signal is separated into two orthogonally polarized components by a polarization splitter 23. That is, one polarized component is output from the polarization splitter 23 into an optical path 22, whereas the other polarized component is output into an optical path 21. Furthermore, the polarized component passing through the optical path 22 rotates its polarization direction through a half-wave plate 20, and has the polarization of the same direction as that of the polarized component passing through the optical path 21. The lightwaves passing through the optical path 21 and the optical path 22 are each focused through the focusing lens 7 on the same point on the spatial light modulator 8.

The lightwave passing through the optical path 22 is reflected upon the spatial light modulator 8 and then propagates through the optical path 21 back towards the arrayed-waveguide grating 1. On the other hand, the lightwave passing through the optical path 21 is reflected upon the spatial light modulator 8 and then propagates through the optical path 22 back towards the arrayed-waveguide grating 1. Here, the optical signal propagating backwardly through the optical path 22 rotates its polarization by 90 degrees through the half-wave plate 20 and is then incident upon the polarization splitter 23. On the other hand, the optical signal propagating backwardly through the optical path 21 is incident upon the polarization splitter 23 as it is. Having passed through the polarization splitter 23, the lightwaves having separately passed through the two optical paths further propagate backwardly through one optical path and are incident upon the cylindrical lens 6. Subsequently, as in the first embodiment, the optical signal passes through the arrayed waveguide 4, the slab waveguide 3, the input waveguide 2, the coupling fiber 13, and the circulator 11, and is finally delivered from the output fiber 12.

According to the aforementioned configuration, the optical signals, which are incident upon the spatial light modulator 8 and propagate through the optical path 21 and the optical path 22, have the same polarized component, and thus will not be affected by the polarization dependence the spatial light modulator possesses.

Figure 15:
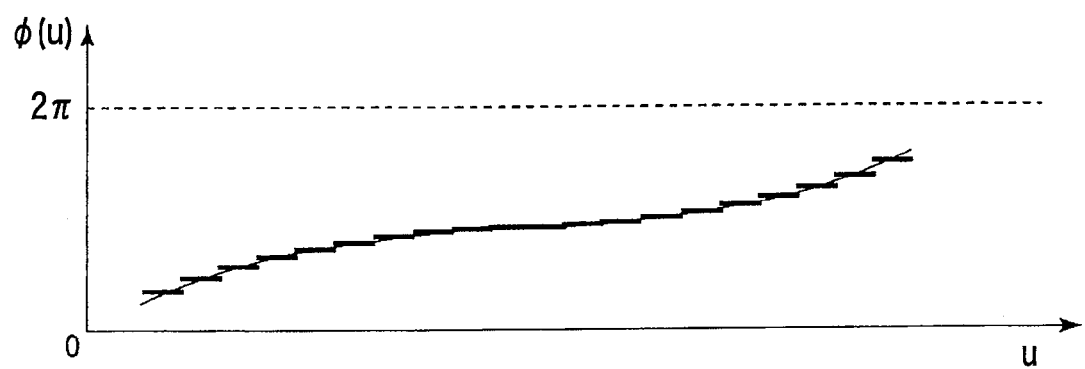
FIG. 15 is a view illustrating an example of a phase distribution provided for the spatial light modulator of the dispersion compensator according to the fourth embodiment of the present invention.

FIG. 15 is a view illustrating an example of a phase distribution provided for the spatial light modulator in the dispersion compensator of the fourth embodiment. In the fourth embodiment, description will be made for not only the aforementioned non-polarization dependency but also an example in which high-order dispersion is imparted to an optical signal in question. To set the ith order dispersion, the setting may be made so that the phase setting distribution of the spatial light modulation device is the (i+1)th order polynomial. For example, to set the second-order dispersion, assuming that u is the coordinates on the u-axis on an intersecting line with a dispersion plane on the spatial light modulator 8, the phase distribution $\phi(u)$ is provided by the following equation;

$$\phi(u) = k3 \times u^3 \text{(rad)} \quad \text{Equation (7),}$$

where k3 is the coefficient, which can be changed to thereby vary the dispersion imparted to the optical signal. Furthermore, as with the first embodiment, the mirror of the spatial light modulation device is disposed discretely in the direction of u, so that the phase value given by the mirror is discrete. Accordingly, the phase given by the ith mirror is represented by the amount of phase $\phi(ui)$ at the center coordinates ui. That is, the amount of phase set by the MEMS phase modulation device is a stepwise distribution as shown in FIG. 15.

Now, an example of specific parameters and numerical values will be shown for the fourth embodiment. The arrayed-waveguide grating was fabricated using silica-based optical waveguides having a relative index difference of 1.5%. The path-length difference of the arrayed waveguide was set to 273 μm, the arrayed waveguide pitch of the arrayed waveguide at the facet 5 to 12.6 μm, and the FSR to 750 GHz. Furthermore, the focus distance of the focusing lens 7 was set to 150 mm, and the focus distance of the cylindrical lens 6 was set to 1 mm. Furthermore, the spatial light modulator 8 was designed such that its pixel pitch was 5 μm and an LCOS used had 2560 pixels in total. The polarization splitter 23 was formed of $YVO_4$ crystal 10 mm in length, and the half-wave plate 20 was formed of polyimide.

The arrangement mentioned above involves 512 mirrors for the LCOS phase modulation device contained in an optical frequency band of 100 GHz. That is, assuming that the grid interval for the WON signal is 100 GHz, 512 pixels per one channel contribute to dispersion. Since the total number of pixels is 2560, dispersion compensation can be made independently for 5 channels for all of the pixels. On the other hand, with the grid interval of the WDM signal being 50 GHz, 256 pixels per one channel contribute to dispersion. Accordingly, dispersion compensation can be made independently for 10 channels for all of the pixels.

As such, the spatial light modulator is set to have multiple pixels along the wavelength axis (the x-axis) of the arrayed-waveguide grating, and the FSR of the arrayed-waveguide grating is set widely so as to contain multiple WDM channels. This advantageously makes the dispersion compensator of the present invention flexibly compatible for system changes such as changes in the WDM channel interval.

Figure 16A:
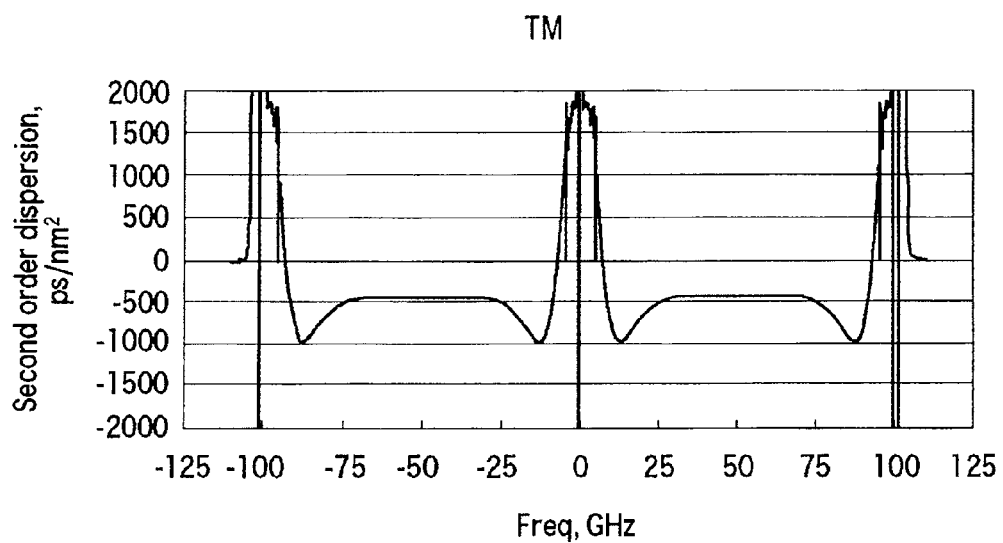
FIG. 16A is a view illustrating the second-order dispersion of the transverse magnetic polarization in the dispersion compensator of the fourth embodiment across two communication channels.
Figure 16B:
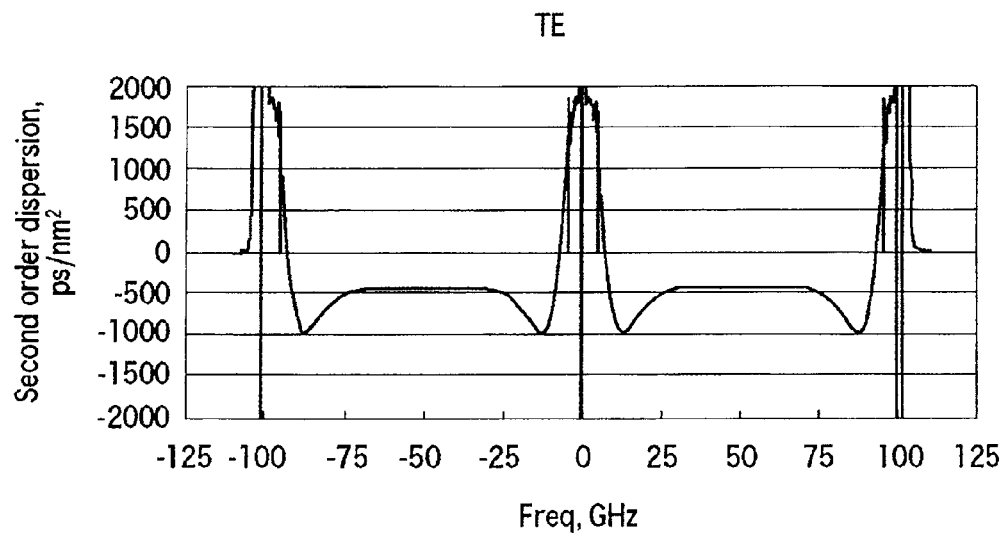
FIG. 16B is a view illustrating the second-order dispersion of the transverse electric polarization in the dispersion compensator of the fourth embodiment across two communication channels.

FIGS. 16A and 16B are views illustrating the second-order dispersion characteristics across two communication channels when the WDM signal grid interval is 100 GHz. FIG. 16A shows the dispersion compensation characteristics of the dispersion compensator for the transverse magnetic polarization when $k3=-2\times10^{-9}$. FIG. 16B shows the dispersion compensation characteristics for the transverse electric polarization. Each vertical axis represents the second-order dispersion (in $ps/nm^2$). It can be seen that a flat second-order dispersion of $-430$ $ps/nm^2$ has been given over an optical frequency range of about 30 GHz within one communication channel.

Figure 17:
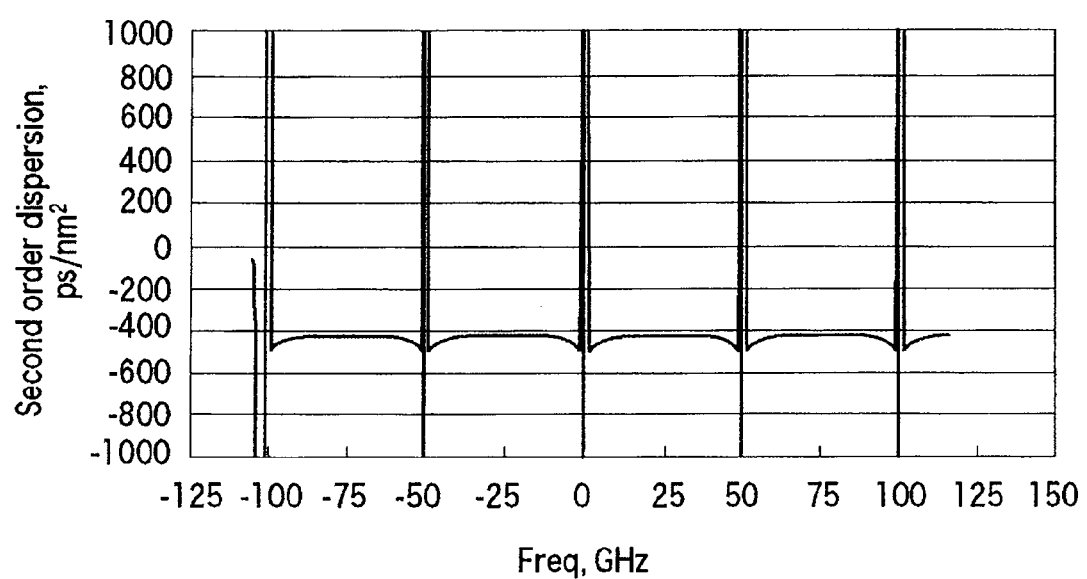
FIG. 17 is a view illustrating the second-order dispersion of the dispersion compensator of the fourth embodiment across four communication channels.

FIG. 17 is a view illustrating the second-order dispersion characteristics across four communication channels with the WDM signal grid being set at 50 GHz. As with the case of FIG. 16, it is possible to obtain a flat characteristic of $-430$ $ps/nm^2$ over an optical frequency range of about 20 GHz within one communication channel. Although FIG. 17 shows only the dispersion compensation characteristics for the transverse magnetic polarization, favorable dispersion compensation characteristics were obtained as well for the transverse electric polarization.

As such, the dispersion compensator according to the fourth embodiment can make dispersion compensation independent of the polarization dependence of the LCOS. Furthermore, as described above, the arrayed-waveguide grating which contains multiple WDM signal channels in one order can be used to use a spatial light modulator that includes a number of pixels covering sufficiently widely the FSR of the arrayed-waveguide grating. This makes it possible to implement a dispersion compensator which is capable of flexibly accommodating changes or expansions of network systems such as changes in the WDM channel interval. Furthermore, the phase distribution imparted to the spatial light modulator can be made to be a high-order polynomial distribution, thereby allowing for setting high-order dispersion to optical signals.

Fifth Embodiment

Figure 18A:
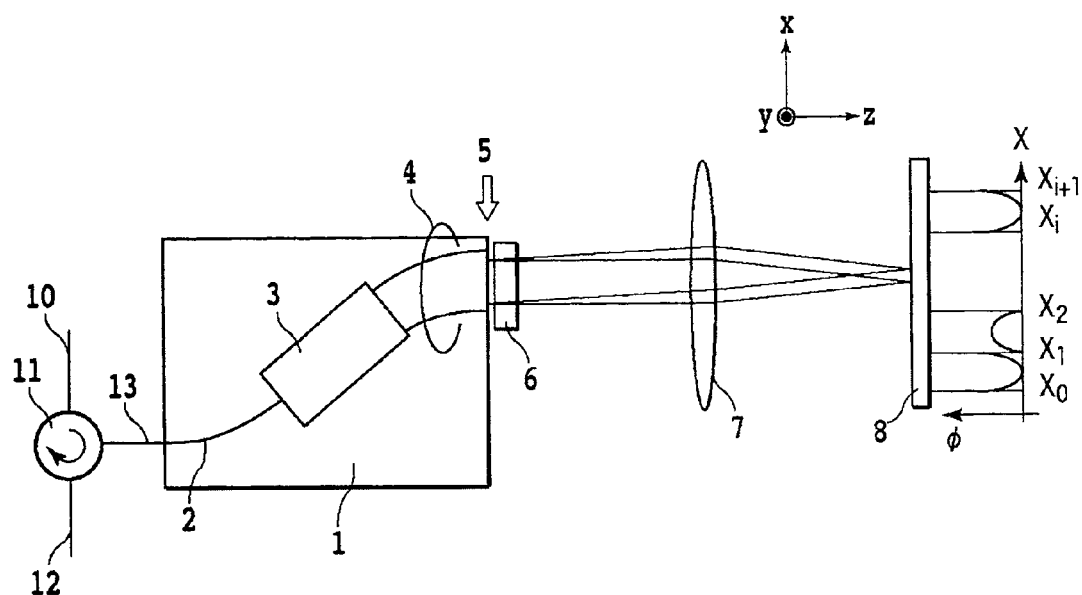
FIG. 18A is a top view illustrating the configuration of a dispersion compensator according to a fifth embodiment of the present invention.
Figure 18B:
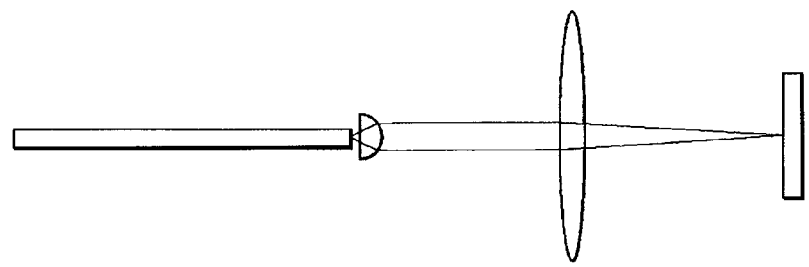
FIG. 18B is a side view illustrating the configuration of the dispersion compensator according to the fifth embodiment of the present invention.

FIGS. 18A and 18B are views illustrating the configuration of a dispersion compensator according to a fifth embodiment. FIG. 18A is a top view (an x-z plane) of the AWG substrate. FIG. 18B is a side view (a y-z plane). The dispersion compensator of this embodiment is configured in the same manner as that of the first embodiment except for the configuration of the spatial light modulator. On the spatial light modulator, multiple sections each independently controlled are formed to implement a multi-channel discrete dispersion compensator.

An optical signal coming through the input fiber 10 is incident upon the input waveguide 2 of the AWG 1 via the circulator 11 and the coupling fiber 13. The optical signal incident upon the input waveguide 2 propagates to the arrayed waveguide 4 via the slab waveguide 3. The arrayed waveguide 4 is made up of a plurality of waveguides, where adjacent waveguides have a path-length difference dL. In the arrayed waveguide 4, optical signals having different wavelengths are spatially dispersed. That is, in the x-z plane (dispersion plane), an optical signal emitted from the facet 5 propagates towards a focusing lens in the direction of the z-axis at a different dispersing angle θ corresponding to its wavelength.

The optical signal emitted from the facet 5 is turned into a converged beam through the focusing lens 7 and thereby focused on the spatial light modulator 8. The linear dispersion effects of the AWG 1 cause the focusing position on the x-axis of the spatial light modulator 8 to vary depending on the wavelength. On the other hand, in the direction of thickness of the AWG substrate, i.e., in the direction of y, the optical signal is converted by the cylindrical lens 6 into a collimated beam, and further focused on the spatial light modulator 8 through the focusing lens 7.

The fifth embodiment is different from the first embodiment in the phase distribution imparted to the spatial light modulator. That is, the spatial light modulator 8 is divided into k sections in the direction of x, so that as with the first embodiment, each section is given a second-order phase distribution expressed by the following equation.

$$f(x) = \begin{cases} k_{20}(x-u_0)^2 & (x_0 \le x < x_1) \\ k_{21}(x-u_1)^2 & (x_1 \le x < x_2) \\ \cdots & \\ k_{2i}(x-u_{i-1})^2 & (x_{i-1} \le x < x_i) \\ \cdots & \\ k_{2k-1}(x-u_{k-1})^2 & (x_{k-1} \le x < x_k) \end{cases} \quad \text{Equation (8)}$$

In Equation (8), $u_i$ is a constant and represents the center of each section, and section $x_{i-1} < x < x_i$ is a region that the optical signal spectrum to be subjected to the dispersion compensation occupies on the x-axis of the spatial light modulator 8. Furthermore, coefficient $k_{2i}$ represents the gradient of the phase setting in the section $x_{i-1}<x<x_i$.

As shown in Equation (8), for each spectrum of the input optical signal, a phase setting can be given to a different region on the spatial light modulator, thereby setting different dispersion values independently for a plurality of WDM signals. Using, as the spatial light modulator, a device having a microscopic pixel structure, such as the LCOS or the divided MEMS, it can be easily implemented to set different dispersion values as described above. Even when the WDM wavelength is relocated as the system operation is changed, each section made up of pixel structures can be relocated, thereby addressing arbitrary WDM wavelength allocation and thus contributing to a flexible system construction.

Now, an example of dispersion compensation operations according to this embodiment will be illustrated with reference to specific exemplary numerical values. The arrayed-waveguide grating was prepared using silica-based optical waveguides having a relative index difference of 1.5%. The path-length difference ΔL of the arrayed waveguide was set to 132 μm, the arrayed waveguide pitch of the arrayed waveguide at the facet 5 set to 10 μm, and the focus distance of the focusing lens 7 to 264 mm. According to this configuration, the free spectral range of the arrayed-waveguide grating is about 1500 GHz. As the spatial light modulator 8, an LCOS (Liquid Crystal on Silicon) type spatial light modulator was used. The LCOS type spatial light modulator is configured, e.g., such that the array pitch of pixels is 8 μm, and the gap between pixels is 0.5 μm, with 1280 pixels being arranged in one dimension. The length in the direction of the x-axis along which the pixels are arranged is 10.2 mm. The configuration is only an example, and the array pitch of the pixels may fall within the range of 5 μm to 10 μm. Accordingly, using the arrayed-waveguide grating and the focusing lens having the aforementioned configuration parameters would allow the 128 pixels of the LCOS to contribute to the phase modulation of the optical signal having a frequency range of 100 GHz. Accordingly, the dispersion compensator configured as above can provide dispersion compensation completely independent of 10 WDM signals that are disposed at 100 GHz intervals.

Figure 19:
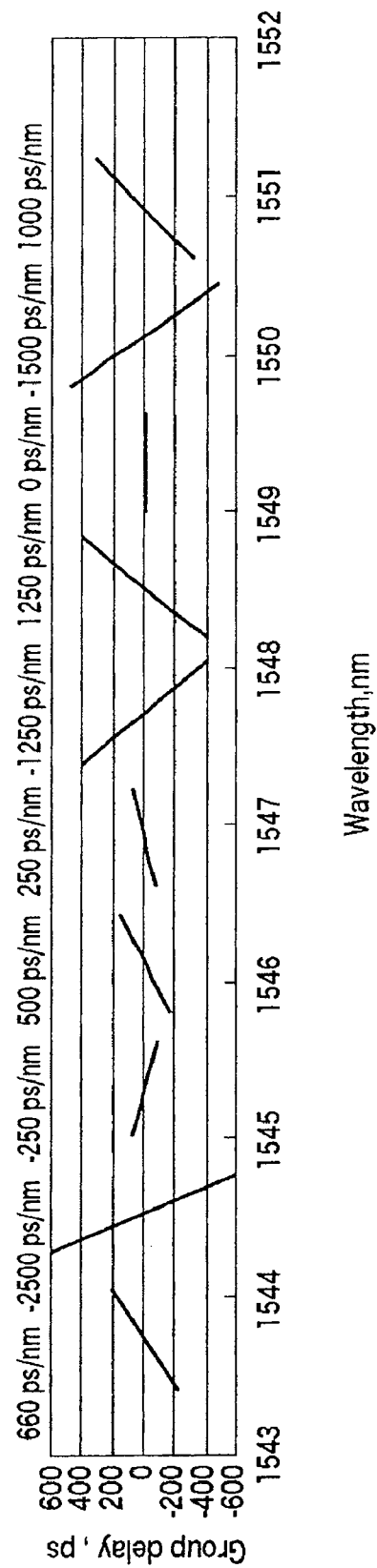
FIG. 19 is a view illustrating the group delay characteristics with different dispersions being set at 100 GHz intervals for WDM signals by the dispersion compensator of the fifth embodiment.

FIG. 19 is a view illustrating the group delay characteristics provided when different dispersions are set for each of the WDM signals that are disposed at 100 GHz intervals according to the dispersion compensator of the fifth embodiment. This is an example in which different dispersion values are independently set for WDM signals at 10 wavelengths in the range of 1543.41 nm to 1550.92 nm. The specified dispersion values are 660, −2500, −250, 500, 250, −1250, 1250, 0, −1500, and 1000 ps/nm from the shortest wavelength.

Conventional single devices have not yet been capable of successfully imparting practical-level dispersion values to a plurality of WDM signals at different wavelengths; the dispersion compensator of the present invention is uniquely prepared to do this. The dispersion compensator constructed using the arrayed-waveguide grating allows for setting dispersion at a practical level. The spatial light modulation device having the microscopic pixel structure can also be used, thereby implementing an arbitrary optical signal frequency range, number of channels, arrangement of signals, high-order dispersion compensation etc. This makes it possible to realize a high-performance variable dispersion compensator which could not be realized conventionally.

The variable dispersion compensator according to the aforementioned fifth embodiment can use one module to provide independent channel-by-channel dispersion compensation to WDM signals in 10 channels. The length of the LCOS used in the direction of the x-axis along which pixels are present was 10.2 mm. Here, assuming that the FSR of the AWG is 6000 GHz and the length of the LCOS in the direction of the x-axis is 20 mm or greater, it is possible to implement a variable dispersion compensator which can provide individual channel-by-channel dispersion compensation to 40 channel WDM signals that are disposed at 100 GHz wavelength intervals.

More specifically, with the number of pixels of the LCOS being 2560 and the array pitch of the pixel being 8 μm, a WDM signal per one channel is associated with 64 LCOS pixels at 100 GHz intervals. This makes it possible to implement a variable dispersion compensator which can provide individual channel-by-channel dispersion compensation to WDM signals in 40 channels. The LCOS now actually available has a length up to about 40 mm. Even to change the spectral characteristics designed to expand to over 40 channels as described above, the AWG can handle this flexibly and readily.

In order to fabricate a multi-channel discrete dispersion compensator which has high stability and reliability and is reduced in size, it is necessary to combine an AWG having a large angular dispersion with an LCOS having a very small array pitch of phase control pixels. Referring to FIG. 18, considering the locus of the center optical axis (chief ray) of the light emitted from the AWG 1, light beams are emitted at different dispersing angles depending on the difference in wavelength. The light beam emitted from the AWG 1 needs to be converted through the focusing lens 7 in terms of its wavefront and incident perpendicularly upon the surface of the LCOS 8. Accordingly, the distance from the focusing lens 7 to the emission end 5 of the AWG 1 and the distance from the focusing lens 7 to the LCOS 8 are both the focal length f of the focusing lens 7, thus necessitating the formation of a 2f optical system.

On the other hand, considering the number of LCOS pixels, the fifth embodiment provides 128 LCOS pixels corresponding to a one-channel WDM signal. Assuming that the array pitch of the pixels is 8 μm and the gap between the pixels is 0.5 μm, the length of the LCOS in the direction of the spectral axis (the x-axis) per one channel needs to be approximately at least 1000 μm. Shortening the length of the LCOS in the direction of the spectral axis would raise concerns that characteristics such as the amount of dispersion compensation or channel transmission bands would degrade. Here, suppose that the signals for which the dispersion compensator is responsible are constructed in 40 channels that include channel wavelengths λ1 to λ40. To separately focus optical signals having wavelengths from λ1 to λ40 on their associated focus positions on the LCOS through the AWG or the diffraction grating, the optical signals need to be provided with a sufficiently wide angular dispersion. Since the larger the angular dispersion, the smaller the focal length f, the optical system can be reduced in its entire length and hence in size. Here, the angular dispersion dθ/dλ of the AWG can be expressed by the equation below;

$$\frac{d\theta}{d\lambda} = \frac{m}{d} \cdot \frac{n_g}{n_c} \qquad \text{Equation (9)}$$

In the equation above, m is the diffraction order, $n_c$ is the effective refractive index of each channel waveguide, d is the waveguide interval at the slab input/output portion of the arrayed waveguide, and $n_g$ is the group index of the effective refractive index of the optical waveguide.

According to Equation (9), to increase the angular dispersion, it is necessary either to reduce d or to increase m. Unlike the bulk diffraction grating, the AWG is characterized in that the optical path length difference between adjacent waveguides of the arrayed waveguide can be adjusted, thereby increasing m and angular dispersions readily. For example, the diffraction order m of the AWG used for the fifth embodiment is approximately 100, and the angular dispersion is 0.8 deg/nm. It is also possible to change the design of the AWG and thereby increase the angular dispersion.

FIG. 20 is a table showing examples of types of diffraction gratings currently available and angular dispersions. With the bulk diffraction grating, its line interval d can be reduced to the minimum of 1 µm, whereas the diffraction order m is not easy to increase. As can be seen from FIG. 20, in the bulk diffraction grating typically used for optical communications, the number of lines per 1 mm is large but the diffraction order cannot be increased, so that the angular dispersion is about 0.18 deg/nm at most. In contrast to this, the AWG can be used as in the present invention to reduce the optical path length to ⅕ or less when compared with the bulk space diffraction grating, thereby reducing the optical signal processor in size.

In this embodiment, the optical signal emitted from the AWG to a free space optical system needs to be optically coupled back to the AWG. Accordingly, to implement each optical component in the optical signal processor, a high positioning accuracy is required. On the other hand, very harsh environmental conditions are imposed on optical communication devices, in the case of which the devices are required to minimize variations in signal processing characteristics even under temperature changes in the range from, for example, 0 to 70 degrees. In an optical signal processor made in modules, the AWG, the focusing lens, and the LCOS or the like, which are shown in FIG. 18, are attached to the module housing or other common members. Accordingly, when the entire return length of the optical system is equal to 1 m or greater, temperature variations would cause the mutual distances between each optical component to be shifted due to thermal expansion of the module housing or the like. This would result in degradation of signal processing characteristics such as increases in optical coupling loss. The stability and reliability of the signal processing characteristics against external disturbance such as temperature variations are the most critical considerations in practical use of optical communication devices. It is important not only to reduce individual modules in size but also to reduce the total length of the free space optical system and the entire size of the device.

The dispersion compensator according to the aforementioned fifth embodiment of the present invention is adapted such that the entire optical length of the free space optical system is about 50 cm at most. On the other hand, the same dispersion compensation characteristics as those of the dispersion compensator according to the fifth embodiment may be obtained using a commonly available diffraction grating. In this case, the free space optical system will have an entire length of 2 m or greater. Using a combination of the AWG and the LCOS as in the present invention will allow for reducing the total length of the free space optical system and reducing the entire size of the device.

Now, description will be made for another unique effect that can be obtained using the AWG according to the present invention. As has already been explained in relationship to FIG. 3, the size of a focusing spot w2 on the spatial light modulation device is desirably as small as possible in a range which satisfies Equation (2) shown again below;

$$w2 \geq wSLM \qquad \text{Equation (2).}$$

The reason for this can be explained as follows in terms of the flexibility of the spot size.

Figure 21:
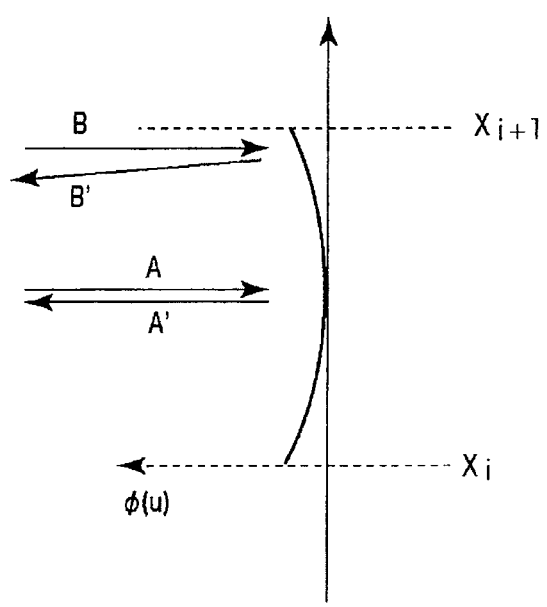
FIG. 21 is an explanatory enlarged view illustrating how an optical signal is reflected on a spatial light modulation device for one channel.

FIG. 21 is an enlarged view illustrating how an optical signal is reflected upon the spatial light modulation device in one channel. Assume that "A" is an optical axis of the optical signal near the center wavelength of one channel, and "B" is an optical axis of the optical signal shifted towards the shorter wavelength. A light beam propagating along the optical axis A is reflected perpendicularly to the pixel-formed face upon the spatial light modulation device as shown in A'. In contrast to this, a light beam propagating along the optical axis B is reflected in a direction slightly inclined as shown in B' because the wavefront is translated due to the phase imparted by the spatial light modulation device. Accordingly, in principle, this may result in loss in an optical signal having a peripheral wavelength away from the center wavelength in each channel. The loss in this peripheral wavelength causes the transmission band characteristics of each channel to be narrowed.

Figure 22:
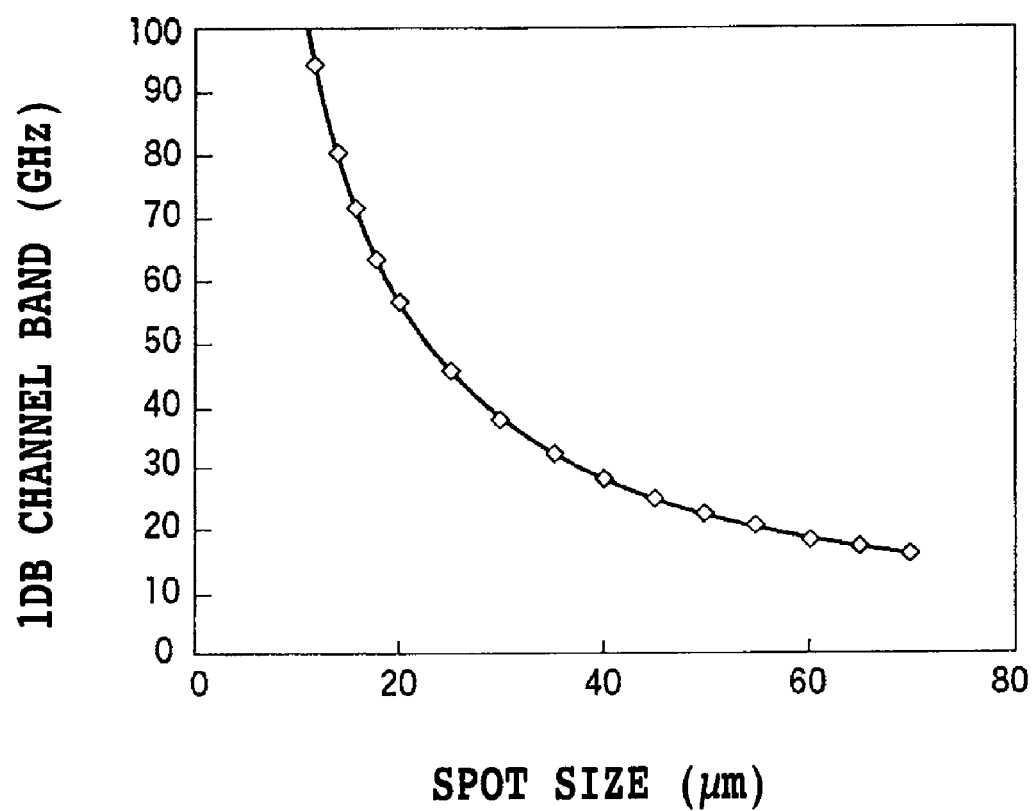
FIG. 22 is a view illustrating the relationship between the spot size on the spatial light modulation device and the channel transmission band.

FIG. 22 is a view illustrating the relationship between the spot size and the channel transmission band. The spot size shown in the horizontal axis represents a beam radius w2 (µm) of monochromatic light in the direction of the spectral axis (along the x-axis) on the spatial light modulation device. The vertical axis shows, in one channel, a 1-dB bandwidth (GHz) at which transmittance is lowered by 1 dB with respect to the value of the center wavelength. Here, in determining the 1-dB bandwidth, note that monochromatic light takes on optical axes in the range from the optical axis A for the center wavelength in the channel to the optical axis B for a peripheral wavelength. Here, the spatial light modulation device is of an LCOS type in which the pixel array pitch is 7 µm and the gap between the pixels is 0.8 µm. As can be seen from FIG. 22, the greater the spot size, the narrower the 1-db bandwidth becomes. As has been explained in relationship to FIG. 21, this is because optical coupling loss is increased in the condition shown with the optical axis B for the optical signal having a peripheral wavelength.

Suppose that processing on wide-band signals is required, e.g., the 1-db bandwidth needs to be 45 GHz or greater. In this case, from FIG. 22, the spot size w2 on the spatial light modulation device (e.g., the LCOS) may be 25 µm or less. Assuming that the optical signal emitted from the AWG is a Gaussian beam, the beam spot size W2 in the direction of the spectral axis (along the x-axis) of the beam radius on the emission plane of the AWG has a relationship with the spot size w2 provided by the following equation;

$$f = \frac{W2 \cdot w2}{\lambda} \qquad \text{Equation (10)}$$

From Equation (10), it is desirable that the beam spot size W2 on the emission plane of the AWG be approximately 4 mm or greater corresponding to the spot size w2=25 µm on the spatial light modulation device. The beam spot size on the emission plane of the AWG can be easily set to a desired value by designing appropriately the number of waveguides in the array and their intervals or the like. Accordingly, the dispersion compensator of the present invention that uses the AWG can flexibly choose spot sizes to satisfy the condition of Equation (2) depending on the pixel arrangement of the spatial light modulator and the required band conditions. Those skilled in the art will understand the advantages of the present invention which are significant in that while using the same fabrication process as conventional ones, a mask layout of the AWG can be readily changed to accommodate various band changes.

Figure 23:
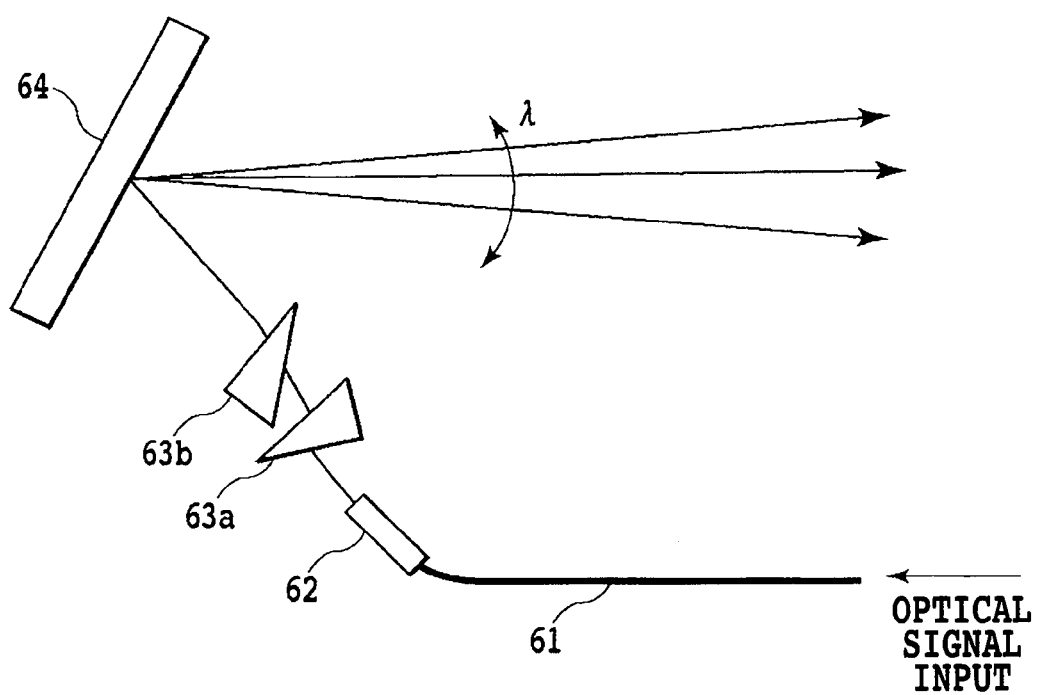
FIG. 23 is an explanatory view illustrating a structure for changing the radius of a beam using a typical diffraction grating.

FIG. 23 is an explanatory view illustrating the arrangement for changing the radius of a beam when a typical diffraction grating is used. To realize a large spot size in the direction of a dispersion axis when a typical diffraction grating 64 is used, a light beam emitted from an optical fiber 61 passes through a collimator lens 62, then allowing the beam radius to be expanded and magnified using a pair of anamorphic prisms 63a and 63b. After that, the optical signal needs to be emitted towards the diffraction grating 64. When compared with the present invention that uses the AWG, the arrangement shown in FIG. 23 requires a significantly increased number of optical components. It is also necessary to align and fix those optical components individually with high accuracy, e.g., with micron accuracy. The increased number of parts causes an increase in price and the time required for assembly is increased as well, resulting in an increase in costs when compared with the arrangement of the present invention which uses the AWG.

The multi-channel discrete variable dispersion compensator described in the fifth embodiment will make full use of the unique advantages when used in actual optical networks. Next, description will be made for the features of the variable dispersion compensator, on an optical network system, according to the present invention.

FIG. 24 shows the types of dispersion compensators classified in terms of the network pattern and the transmission rate. The multi-channel discrete variable dispersion compensator of the present invention is classified as type (c). In each column of FIG. 24, the configurations of receivers including the dispersion compensator are shown from left to right corresponding to technological advancements in terms of the transmission rate and the dispersion tolerance level. In each row, the first and second rows show typical network patterns, i.e., the point-to-point network and the ROADM (Reconfigurable Optical Add-Drop Multiplexer) network, respectively.

The dispersion tolerance is defined as the range of residual dispersion that satisfies the transmission quality of a certain standard (the total sum of the amounts of dispersion given by the transmission path fiber and the dispersion compensator). The dispersion tolerance decreases in inverse proportion to the square of the bit rate of the optical signal, so that as the transmission rate increases, the dispersion compensation technique becomes more critical. For example, in a 10 Gbit/s transmission system, the dispersion tolerance of optical signals is about 1000 ps/nm. Considering that the amount of dispersion of the single mode fiber (SMF) is about 17 ps/nm/km, optical signals could reach only about 60 km without the dispersion compensation technique. The dispersion tolerance in a 40 Gbit/s transmission would be 1/16 or about 60 ps/nm, so that with the SMF, optical signals can be transmitted only about 4 km.

Referring back to FIG. 24, for the currently widespread type (a) and (d) network structures, the DCF (Dispersion Compensation Fiber) is used, thereby compensating for the chromatic dispersion in each transmission path span of the networks. However, for a high-speed network with an optical transmission rate of 40 Gbit/s, the (b) and (f) type configurations are being used. As described above, in the 40 Gbit/s high-speed network, the dispersion tolerance at the receiver is significantly reduced when compared with the transmission rate of 10 Gbit/s, i.e., approximately 60 ps/nm. In such a case, variations and temporal changes in chromatic dispersion in each channel cannot be compensated for collectively by only one DCF that is located in the preceding stage of a DEMUX.

In this context, as shown in type (f) of FIG. 24, the dispersion of all the channels needs to be compensated for collectively through the DCF, and then each channel has to be further compensated for individually by a TODC. However, in reality, provision of the TODC for 40 individual channels would cause increases in costs as well as in size of the reception block of the optical signal processor. Accordingly, those patterns as the types (c) and (g) equivalent to the present invention are desired which require no individual TODC.

For the point-to-point system, the optical signal at each wavelength is transmitted as a WDM signal through the same one optical fiber. The dispersion compensation value for the optical signal of each wavelength needs to be associated with those components that have not been compensated for by the DCF. The deviated component will uniformly increase or decrease with respect to the wavelength and is composed predominantly of a component having a uniform slope. Thus, it is necessary to use the dispersion slope compensation as shown in the type (g). Furthermore, since a ring network that uses the ROADM has paths that differ depending on the wavelength, a dispersion slope compensation provided by the type (g) will not be sufficient. Thus, it is inevitably necessary to provide the multi-channel discrete variable dispersion compensator which has been suggested in the fifth embodiment of the present invention. The multi-channel discrete variable dispersion compensator of the present invention would also eliminate the need for the DCF that is typically used. It can be expected from now on that the transmission rate will be increased towards 40 Gbit/s, so that the role of the network, typified by the ROADM, which provides different paths for each wavelength will be increasingly demanded. Thus, a further demand will be raised for the multi-channel discrete variable dispersion compensator suggested in the present invention.

While an exemplary application of the dispersion compensator of the present invention for a network system has been illustrated, the invention will not be limited to the type (c) pattern; all the dispersion compensation functions other than that of the type (c) can also be provided at the same time. In particular, a system of class 40 Gbit/s requires an adjustment to the amount of dispersion compensation even when part of an optical fiber route is changed for maintenance operations due to accidents or road construction. Even in such a case, use of the multi-channel discrete variable dispersion compensator would provide great advantages. Furthermore, even in expanding and changing the existing optical fiber system from 10 Gbit/s to 40 Gbit/s or developing it into a network structure of the various types listed in FIG. 24, the dispersion compensator can be used as it is. Although it is a matter of course, the dispersion compensator can also be used in combination with the DCF. As has been described in detail, the multi-channel discrete variable dispersion compensator of the present invention has an excellent feature that it is applicable to various types of systems in a flexible manner.

Such a network has also been suggested which varies the channel band depending on the signal rate of each channel. More specifically, an increased transmission capacity is required for channel 1 to channel 30 and thus one channel is assigned a 100 GHz band to use a transmission rate of 40 Gbit/s, while the remaining channels are assigned 50 GHz bands to use a 10 Gbit/s transmission rate. Furthermore, the band to be assigned may also be changed with the passage of time.

When the spatial light modulation device is viewed on the spectral axis in the variable dispersion compensator of the present invention, the pixel is finer than the spot size (w2) of an optical signal beam. Those boundaries between each channel defined in a plurality of sections across multiple pixels are not physical ones that fixedly specify or restrict the signal processing function. It is thus possible to flexibly change and set the dispersion compensation function in accordance with the band of each channel required for the system. For example, to change the 100 GHz channel to a 50 GHz channel in the arrangement of the fifth embodiment, this can be implemented by changing the number of pixels per one channel from 128 to 64 without changing the arrangement of the optical signal processor at all.

Actual nodes use simultaneously not only the dispersion compensation function but also the function for controlling optical intensities for each wavelength as with the wavelength blocker. In the fifth embodiment, the optical intensity can be controlled in the same way as explained in FIG. 11 using an LCOS with pixels arranged not one-dimensionally but two-dimensionally. In that case, one optical signal processor module arranged as shown in the fifth embodiment can implement both the functions of the multi-channel discrete variable dispersion compensator and the wavelength blocker.

Sixth Embodiment

In relationship to the first embodiment, a discussion was made concerning a simple relationship between the focusing spot on the spatial light modulator and the pixel size, showing that no ripple would occur in the transmitted spectrum and dispersion of the dispersion compensator when Equations (2) and (3) shown again below are satisfied;

$$w2 \geq wSLM \qquad \text{Equation (2), and}$$

$$w2 \geq gSLM \qquad \text{Equation (3).}$$

In the above equations, w2 is the radius at which the optical intensity of a monochromatic light focusing spot on the spatial light modulator is $1/e^2$, i.e., 13.5% of the peak optical intensity; wSLM is the width of a pixel of the spatial light modulator; and gSLM is the gap between the adjacent pixels (see also FIG. 3). In this embodiment, a method will be shown for further reducing ripples that would otherwise occur to the group delay characteristics given by the dispersion compensator.

The spatial light modulation device imparts a phase shift having a second-order distribution (hereinafter referred to as "the phase function") to the wavelength of an input optical signal. However, since the spatial light modulation device is formed of pixels and the phase shift values imparted are discrete, a continuous phase function cannot be approximated with accuracy. Here, assuming that the repetitive cycle of the spatial light modulation device in the direction of the spectral axis is "p" (=wSLM+gSLM), its space frequency is expressed by 1/p. That is, the continuous phase function to be given by the spatial light modulation device is sampled at a sampling frequency of 1/p.

On the other hand, a focused beam incident upon the spatial light modulation device has a shape with an effectively finite width such as of the Gaussian function. The beam shape with a finite width has such effects that the phase shift given by the phase function is integrated while being weighted according to the beam shape. With the aforementioned Gaussian beam having a width of w2, this Gaussian beam behaves as a low-pass filter (hereinafter referred to as LPF) having an integration range of 2×w2. In other words, the cutoff space frequency of this LPF is 1/(2×w2). This is equivalent to the fact that the analog filter defined by the Gaussian shape of the focused beam is inserted into the preceding stage of the spatial light modulator for performing discrete sampling. That is, this represents that the beam spot of a width W2 on the LCOS has a function equivalent to an antialiasing filter or a function equivalent to an analog filter to be inserted immediately after the DA converter of a direct digital synthesizer. Furthermore, the fact that the cutoff frequency of this filter satisfies Equation (11) below can be derived from information theory or Nyquist's theorem:

$$\frac{1}{2 \times w2} < \frac{1}{2p} \qquad \text{Equation (11)}$$

The explanation of the filter function specified by the aforementioned focused beam shape also gives a condition for removing a high-order diffracted light beam resulting from the pixel structure of the spatial light modulation device. Here, for example, referring to FIG. 1, description will be made for the condition for removing a high-order diffracted light beam. Assuming the wavelength of an incident optical signal being λ, a high-order diffracted light beam is output at an angle θ=λ/p with respect to a normal to the spatial light modulation device corresponding to the pixel cycle p of the spatial light modulation device 8. The optical signal is collimated, through the Fourier transform operation of the focusing lens 7, into a Gaussian beam with a width W2=λ·f/πw2 about the position at f·θ from the center of the arrayed-waveguide grating on the arrayed-waveguide grating end 5. Here, "f" represents the focus distance of the focusing lens 7.

To avoid a high-order diffraction component from coupling to the input waveguide 2, it is necessary to be sufficiently apart from a unique mode (a Gaussian mode with 0 at the center and a width of λ·f/πw2) formed by an incident light beam from the input waveguide 2 on the arrayed waveguide end 5. In general, it is known that the strength of the Gaussian beam is sufficiently reduced, or 0.1% or less than the center strength, at a point from its center about twice the Gaussian beam width W2. Accordingly, the following equations can be obtained;

$$f \cdot \theta \geq 2 \times W2 \qquad \text{Equation (12), and}$$

$$w2 \geq 2/\pi \cdot d \approx p(=wSLM+gSLM) \qquad \text{Equation (13).}$$

From Equation (13), the conditions for Equations (2) and (3) are obtained. The aforementioned explanation relates to a demand to the relationship between the beam size and the pixel size derived from the diffraction theory.

Figure 25A:
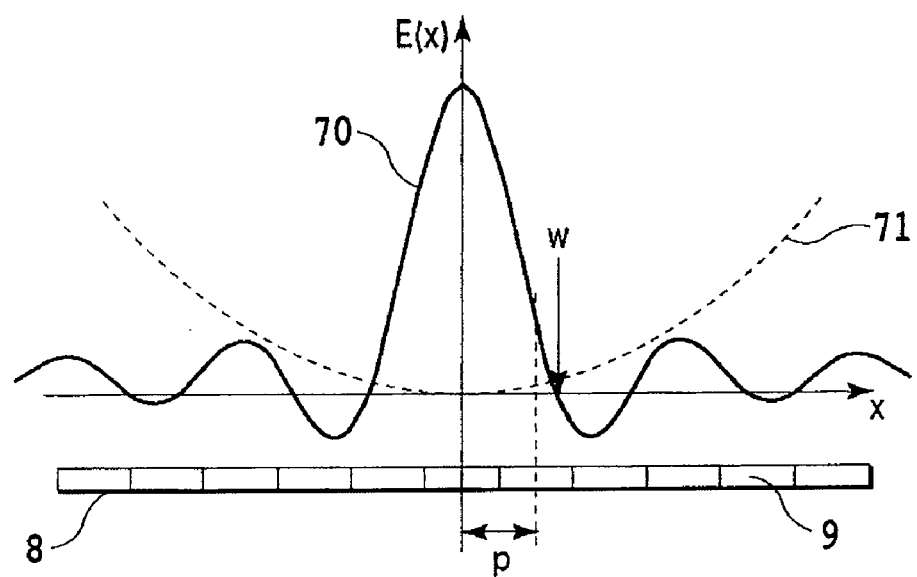
FIG. 25A is a view illustrating an electric field distribution of a beam focused on a spatial light modulator in an antialiasing filter according to a sixth embodiment of the present invention.
Figure 25B:
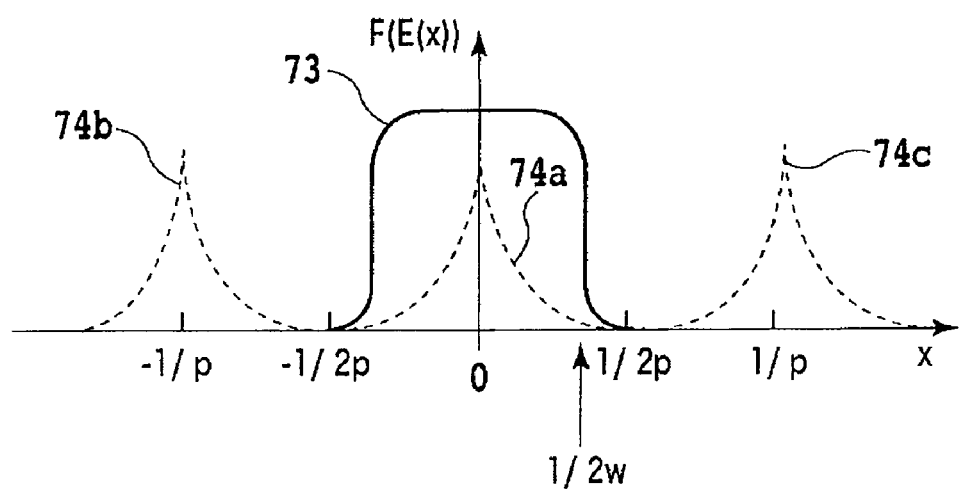
FIG. 25B is a view illustrating the spectrum of a phase function sampled with a pixel of the spatial light modulator in the antialiasing filter according to the sixth embodiment of the present invention.

FIGS. 25A and 25B are explanatory schematic views illustrating an antialiasing filter according to a sixth embodiment of the present invention. The sixth embodiment suggests a method for synthesizing an antialiasing filter having a better shape than the Gaussian shape, as the antialiasing filter mentioned above. FIG. 25A shows the spatial light modulator 8 and an electric field distribution 70 of a beam to be focused on the spatial light modulator. The electric field distribution 70 has a shape of the sinc function. Furthermore, the distance w from the center of the sinc function to the first zero is set to satisfy the following equation;

$$w \geq p \qquad \text{Equation (14).}$$

FIG. 25B shows a phase function spectrum 74a and a sinc type function spectrum 73 which were sampled at the pixels of the spatial light modulator. This sampling has effects on the phase function spectrum 74a so that turn-back spectra 74b and 74c occur at intervals of a space frequency 1/p in conjunction with infinite harmonic components. These harmonic components 74*b* and 74*c* will be turn-back noises causing ripples in the group delay characteristics when the spatial light modulator is operated as a dispersion compensator. It is thus necessary to remove the turn-backs caused by these harmonic components 74*b* and 74*c*. The sinc function spectrum 73 takes on a rectangular shape and can effectively suppress harmonic components. Furthermore, the position of the first zero is set as in Equation (13), thereby making the rectangular filter cutoff frequency ½w. This is lower than the Nyquist rate ½p, allowing the filter to act as an antialiasing filter.

When the Gaussian function as shown in the first embodiment is used as a filter, the Gaussian width on the spatial light modulation device may be widened, thereby allowing for effectively suppressing harmonic components. However, this also restricts the signal bandwidth of the phase function at the same time. This leads to the fact that the band characteristics of the space frequency band in a phase distribution defined on the spatial light modulator are narrowed to deteriorate the dispersion compensation characteristics. On the other hand, using the sinc type function of this embodiment and its Fourier transform or a rectangular filter as an antialiasing filter makes it possible to ensure the signal bandwidth of the phase function. It is thus possible to use a sharp filter characteristic to cut harmonic components without degrading the dispersion compensation characteristics and remove turn-back noise components in the group delay characteristics.

The beam shape on the spatial light modulation device can be determined to have a sinc function type electric field distribution as mentioned above, thereby removing the sampling effects or the diffraction effects provided by the spatial light modulation device. To realize such a sinc function type electric field distribution, the optical system may be constructed as follows. For example, in the first embodiment shown in FIG. 1A, the focusing lens 7 has effects of the Fourier transform, so that the electric field distribution at the facet 5 of the arrayed-waveguide grating is the spectrum itself of the antialiasing filter shown in FIG. 25B. Accordingly, the electric field distribution can be easily realized by the proportion of allocation of optical intensity to the arrayed waveguide 4 being set to the shape of the rectangular filter. To adjust the proportion of allocation, the opening width of the waveguide at the connection boundary between the arrayed waveguide 4 and the slab waveguide 3 may be appropriately adjusted. Alternatively, loss may be imparted to each arrayed waveguide on the way of the arrayed waveguide 4, thereby making the optical intensity distribution at the facet 5 rectangular.

As can be seen from the aforementioned description, the harmonic component in the space spectrum shown in FIG. 25B can be found to be a diffracted light beam caused by the pixels of the spatial light modulator. Accordingly, installing such an antialiasing filter as mentioned above is equivalent to pushing the diffracted light beam out of the opening of the arrayed waveguide 4.

While such an example has been shown in which a rectangular filter provided by the Fourier transform of a sinc function is used to remove sampling effects, the filter shape is not limited to the rectangular shape, and any filter shapes can be used as long as they are constructed using the FIR characteristics of the AWG. For example, the filter shapes may include that of a filter, such as the Butterworth filter, which is combined by controlling the allocation rate of optical intensity to its array and the phase of light at the facet of the array, the filter shapes being known in the general filter combination theories.

Seventh Embodiment

The seventh embodiment relates to a method for installing the variable dispersion compensator of the present invention, showing an embodiment as an example of nodes constructed in the ring type network. As has been described above, the variable dispersion compensator of the present invention has disclosed a scheme for setting different dispersion values by one variable dispersion compensator module to optical signals in multiple WDM channels. First, description will be made for a node structure where the variable dispersion compensator of the present invention is not used.

Figure 26:
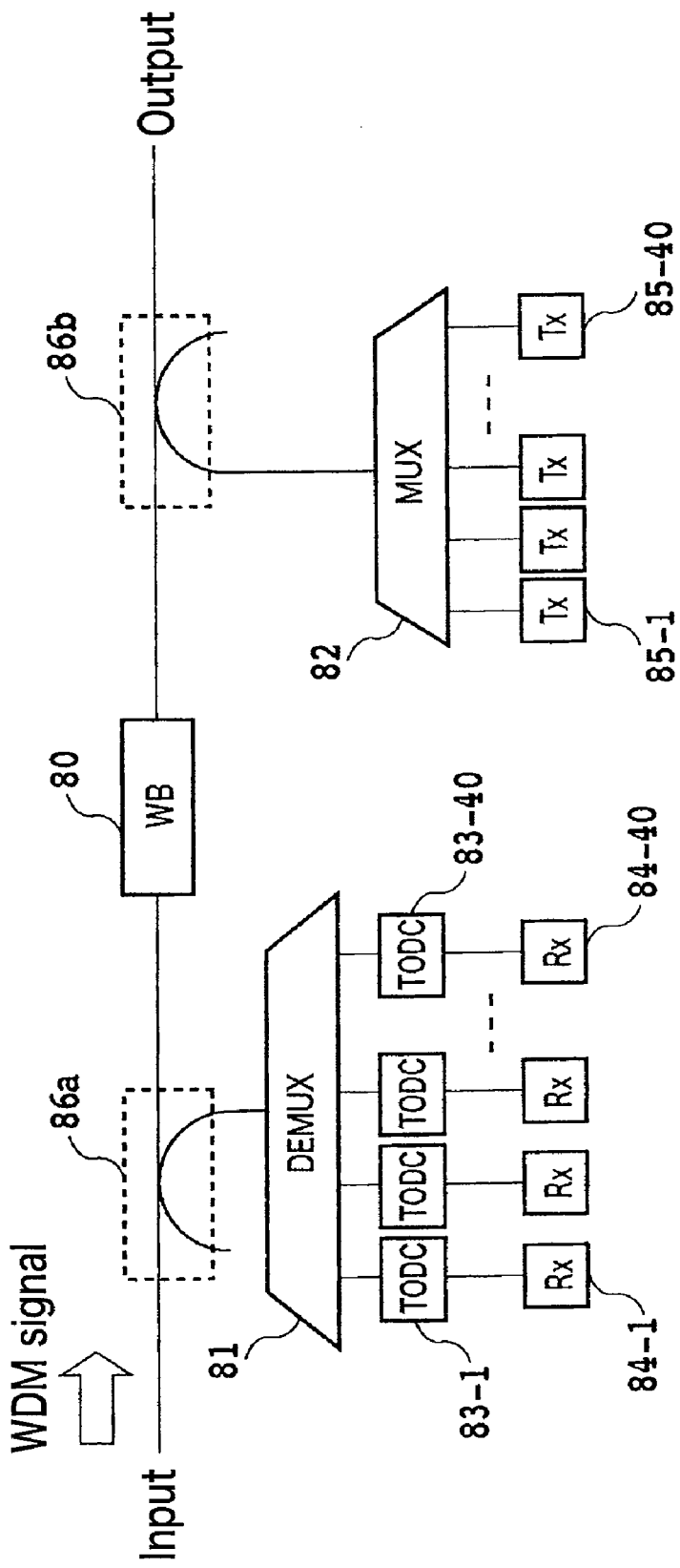
FIG. 26 is a view illustrating a general network structure which uses a conventional variable dispersion compensator.

FIG. 26 is a view illustrating a typical network structure which uses a conventional variable dispersion compensator. A WDM signal supplied through the input of a node is treated in a manner such that a first tap 86*a* demultiplexes the WDM signal into a main route, where all the channels are of a ring, and a drop port. The dropped WDM signal is demultiplexed by a DEMUX 81, thereafter each waveform-shaped by their respective individual variable dispersion compensators 83-1 to 83-40, and received by receivers Rx 84-1 to 84-40. On the other hand, of those WDM signals which have not been demultiplexed by the first tap 86*a* but propagated through the main ring, the added/dropped signal at the node is made extinct by a wavelength blocker (WB) 80. The extinct wavelength signals are combined at transmitters 85-1 to 85-40 (Tx) and a combiner (MUX) 82 and then output via a second tap 86*b* in combination with a signal from the wavelength blocker 80. As such, this configuration requires the variable dispersion compensators 83-1 to 83-40 corresponding to the number of the WDM channels. In the 40-wave WDM system, 40 variable dispersion compensators 83-1 to 83-40 are required, and thus the system does not have an economical network structure.

Figure 27:
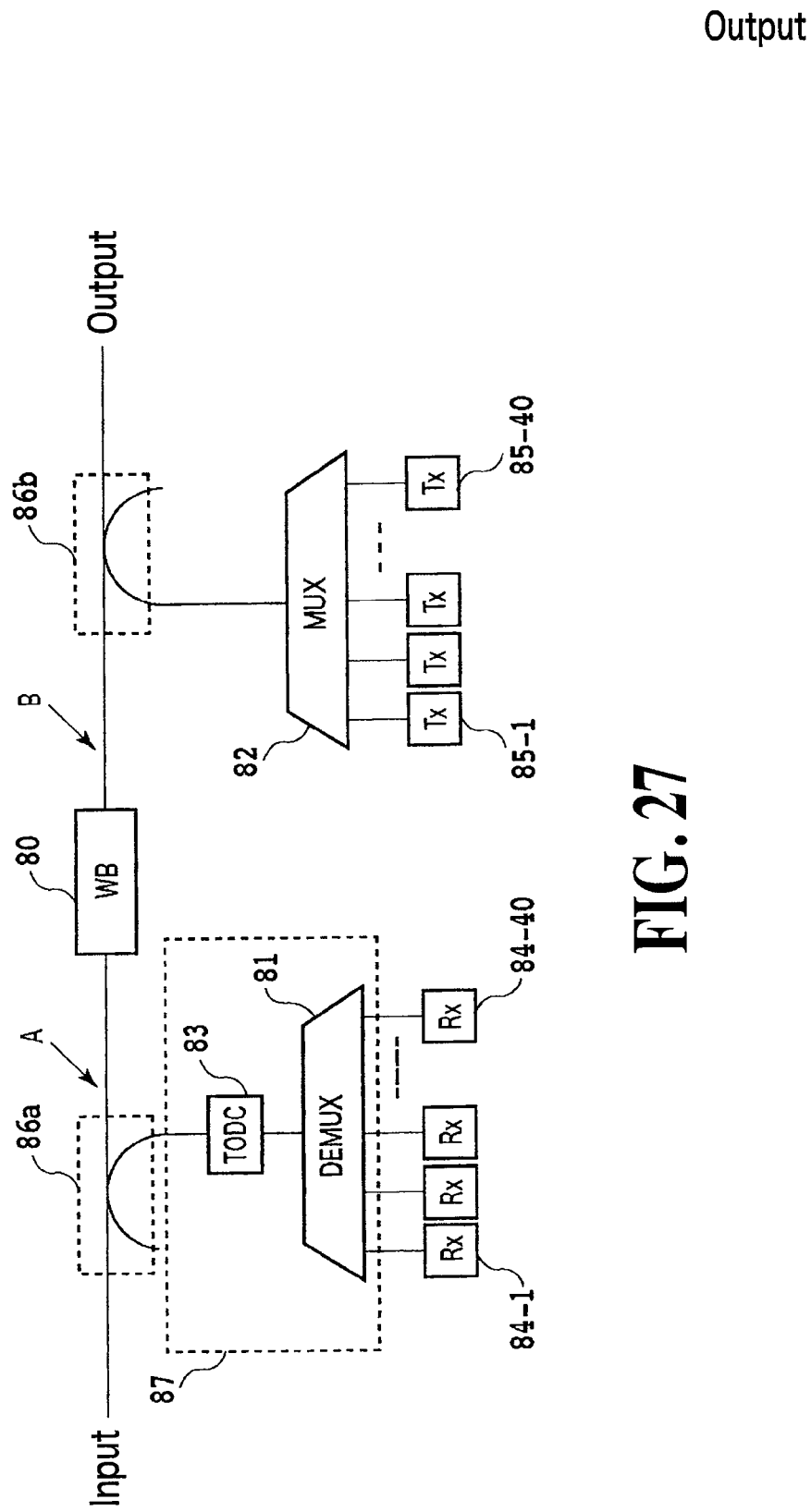
FIG. 27 is a view illustrating a network structure which uses a variable dispersion compensator of the present invention.
Figure 28:
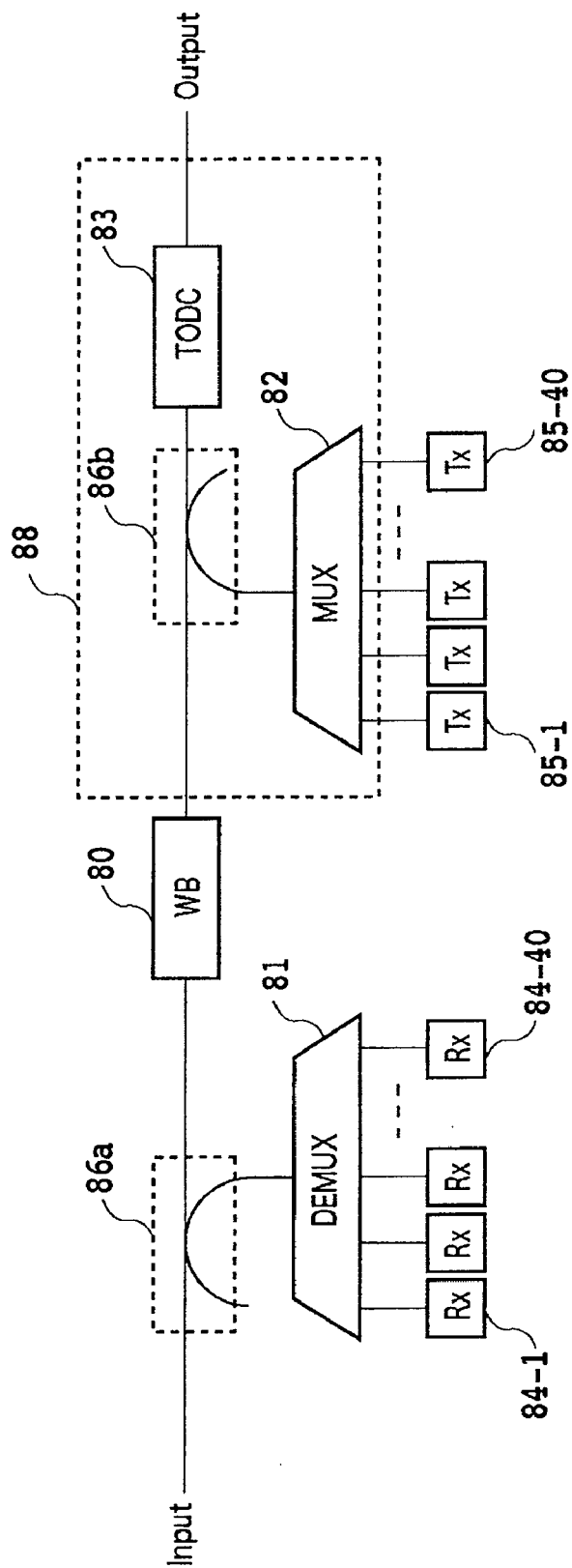
FIG. 28 is a view illustrating another network structure which uses a variable dispersion compensator of the present invention.
Figure 29:
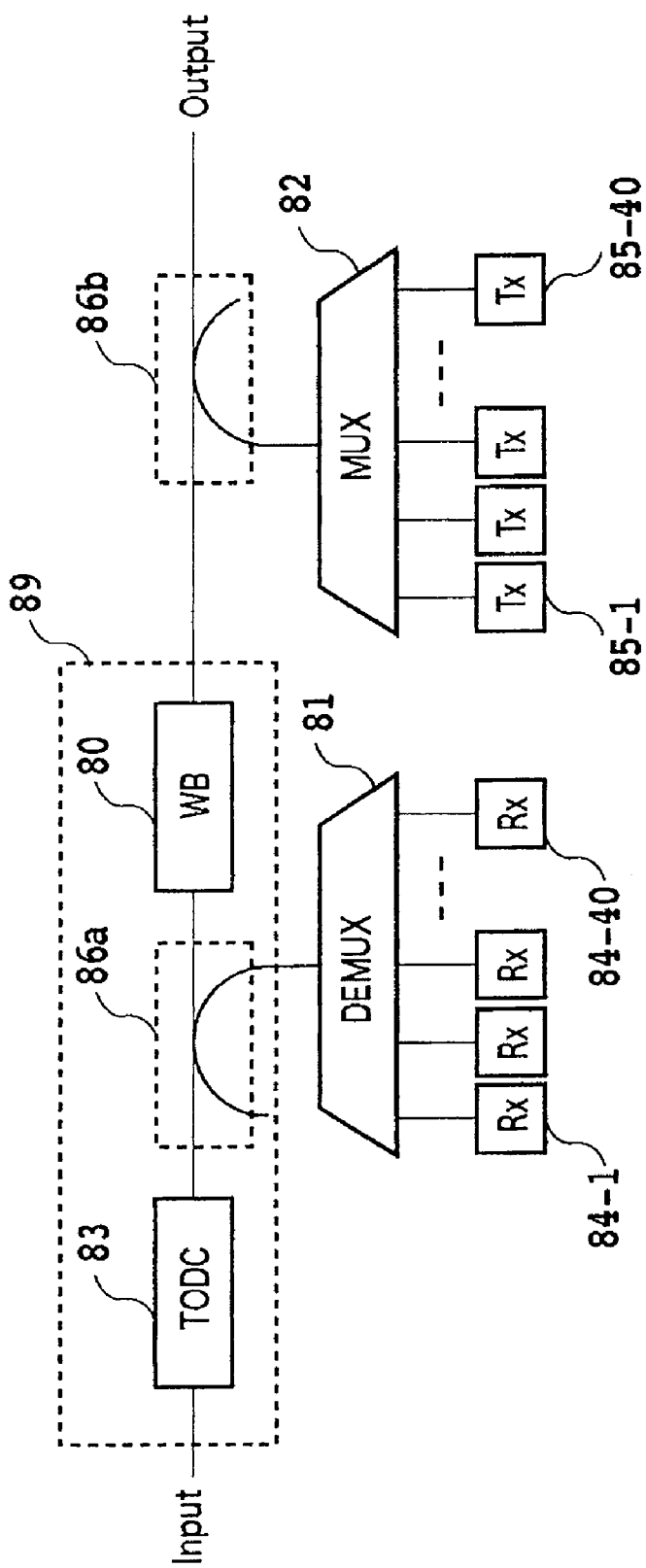
FIG. 29 is a view illustrating still another network structure which uses a variable dispersion compensator of the present invention.
Figure 30:
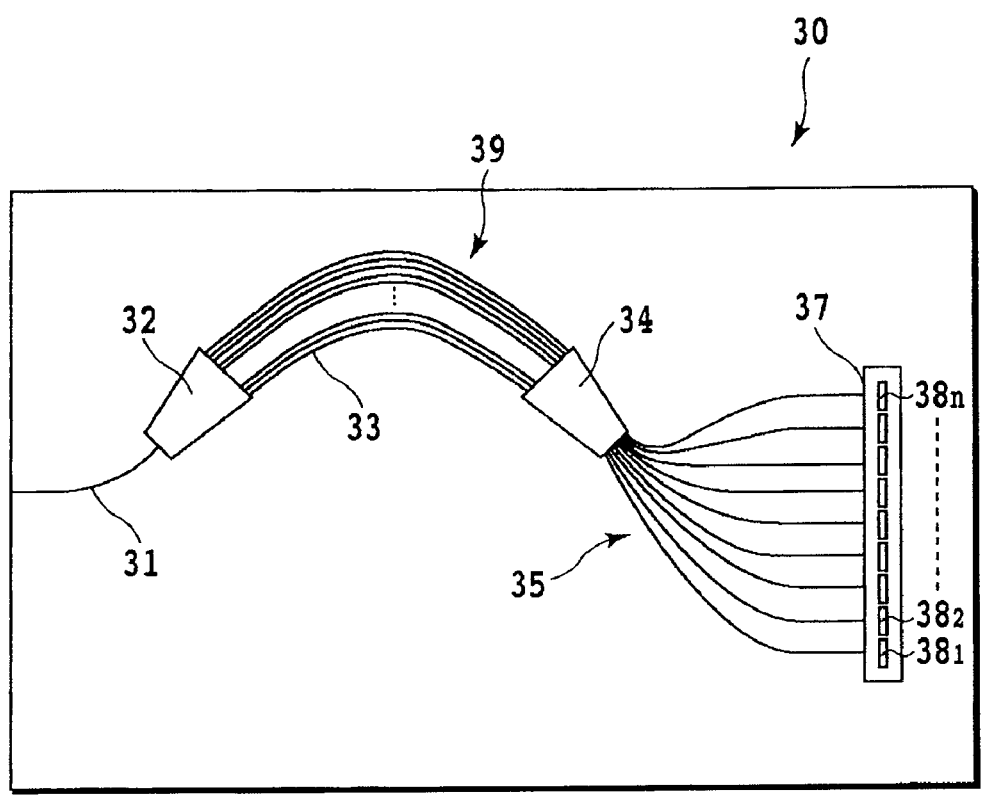
FIG. 30 is a view illustrating a dispersion compensator which uses an arrayed-waveguide grating according to a conventional technique.
Figure 31:
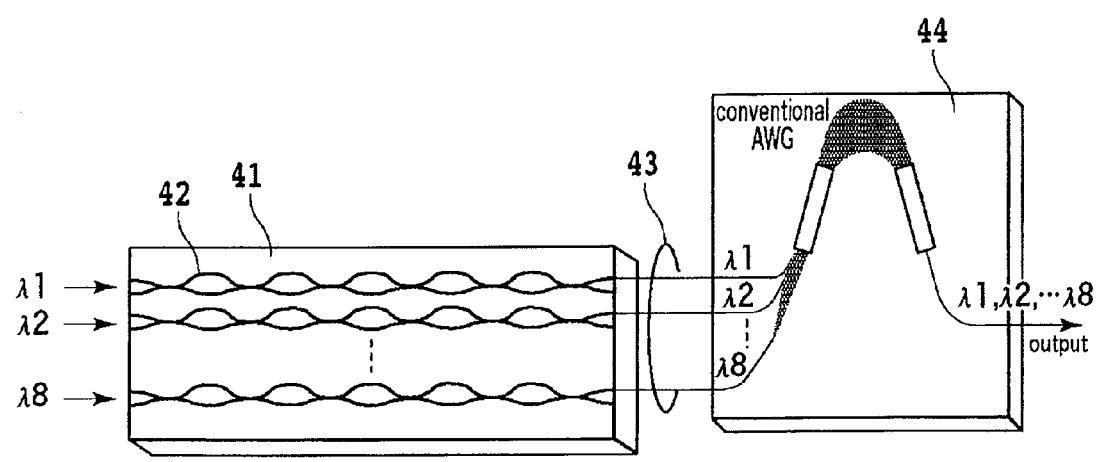
FIG. 31 is a view illustrating the configuration of a lattice filter dispersion compensator made of a silica-based optical waveguide according to a conventional technique.
Figure 32:
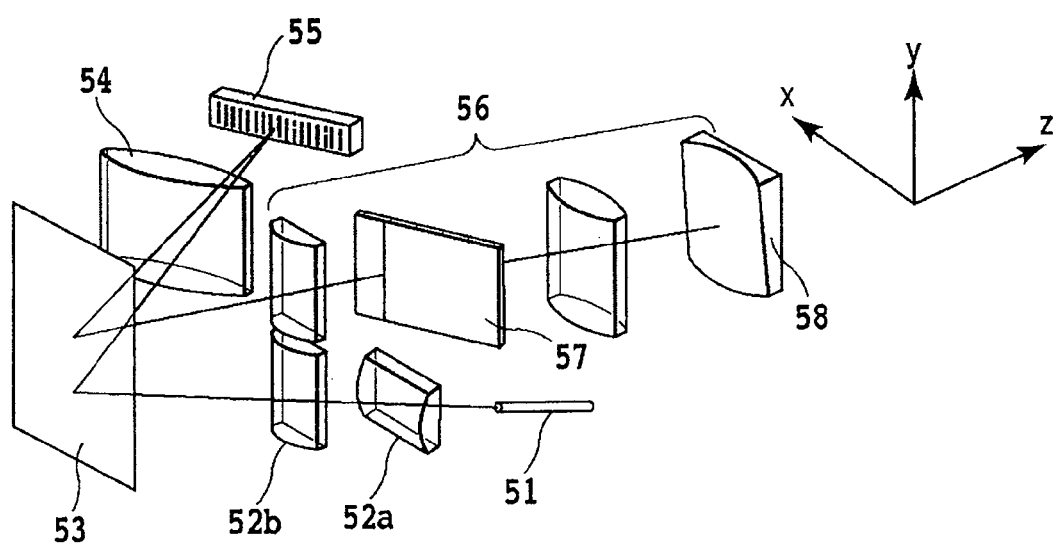
FIG. 32 is a view illustrating the configuration of a dispersion compensator which uses a VIPA and a three-dimensional mirror according to a conventional technique.

FIGS. 27, 28, and 29 are views each illustrating an example of a network structure which uses the variable dispersion compensator of the present invention. In FIG. 27, the WDM signal supplied is branched by the first tap 86*a* into a ring main route and a drop port. The optical signal branched into the drop port is waveform shaped by the variable dispersion compensator 83 of the present invention. After having been waveform shaped, the optical signal is demultiplexed at the DEMUX 81 to propagate to the receivers 84-1 to 84-40. Unlike the structure described in relationship to FIG. 26, this configuration does not require the variable dispersion compensators corresponding in number to the WDM channels, thereby providing a significantly economical network system. As indicated with the dotted lines, it is also possible to integrate the variable dispersion compensators 83, which can provide independent dispersion compensation for multiple wavelengths, and a dispersion component 87 into a function block 87, which can be formed as a module or a board. This integration can reduce the number of optical fibers that connect between the function blocks, thereby facilitating the maintenance of the network system and the optical signal processor.

The position into which the variable dispersion compensator of the present invention is inserted is not limited to the examples in FIG. 27, and FIG. 28 or 29 to be discussed later, as long as the position can serve to provide the dispersion compensation function or chirping effects to be described later. For example, the variable dispersion compensator may be inserted into either point A or B in FIG. 27, in each case of which the chromatic dispersion of a signal passing through these points in each channel can be compensated for.

FIG. 28 is a view illustrating an example of another network structure which uses the variable dispersion compensator of the present invention. In this structure, signals from transmitters 85-1 to 85-40 are combined through a combiner component (MUX) 82. The signals are also combined by the second tap 86b with a signal from the wavelength blocker 80. After that, as shown in FIG. 28, the variable dispersion compensator of the present invention 83 may be incorporated to thereby provide a pre-chirp to each signal and prevent degradation in the signal waveform caused in the course of transmissions. In this case, the combiner component (MUX) 82, the variable dispersion compensator 83, and the second tap 86b can be integrated as a function block 88 in one module or on a board, thereby advantageously facilitating the maintenance of the network system. FIG. 28 shows an example in which the variable dispersion compensator 83 is installed closer to the output side (the right side in the figure) than the second tap 86b is, however, the dispersion compensator can also be installed between the combiner component (MUX) 82 and the second tap 86b.

FIG. 29 is a view illustrating still another network structure example which uses the variable dispersion compensator of the present invention. As shown in this arrangement, a WDM signal from the input is first input to the dispersion compensator 83 of the present invention to be waveform shaped, and then subjected to the drop/add operation. As shown with the dotted lines, the variable dispersion compensator 83, the first tap 86a, and the wavelength blocker (WB) 80 can be integrated as one function block 89 in one module or on a board, thereby advantageously facilitating the maintenance of the network system and the optical signal processor.

This embodiment has illustrated a node structure which uses the variable dispersion compensator of the present invention in a ring type network. However, in the point-to-point type and mesh type networks, the node structure can also be provided by integrating the dispersion component and the variable dispersion compensator or the combiner component and the variable dispersion compensator. As with the example structures in FIGS. 27 to 29, this will advantageously facilitate the maintenance of the network system and the optical signal processor.

As has been described in detail, the dispersion compensator of the present invention has existing general-purpose low-cost optical components combined into a relatively simple free space optical system, and is thus realized as a dispersion compensator that enables flexible setting of dispersion characteristics. This dispersion compensator has a reduced size, high flexibility of setting dispersion characteristics, and high manufacturability. The use of the AWG can realize a flexible optical design that would not be available to the bulk diffraction grating, and further improved optical characteristics. For example, a bulk diffraction grating is used with its diffraction order being as low as from the first to second order, however, the design flexibility of the arrayed-waveguide grating allows for setting higher orders from a few tens to several thousands of orders. Accordingly, as shown in Equation (9), it is possible to set higher dispersion values.

Furthermore, according to the dispersion compensator of the present invention, phase settings can be provided respectively for different sections of the spatial light modulator, thereby independently setting different dispersion values for multiple WDM signals. Those devices having a microscopic pixel structure such as the LCOS or the divided MEMS can be used as the spatial light modulator, thereby facilitating the setting of different dispersion values. WDM wavelengths may need to be relocated as changes are made to the operation of the optical communication system. Even in this case, the phase setting value of each section formed by the pixel structure can be modified, thereby accommodating any location of WDM wavelengths. It is thus possible to contribute to flexible system constructions and easy changes in system configuration. Furthermore, the dispersion compensator can reduce the costs of the optical communication system in combination with the advantageous optical design flexibility of the AWG.

INDUSTRIAL APPLICABILITY

The present invention is applicable to optical communications, and in particular, preferable in use for ring-mesh type networks which use wavelength selective switches.

The invention claimed is:

1. A dispersion compensator comprising:
   a first dispersive element for dispersing an optical signal at an angle according to a wavelength of an input optical signal;
   at least one focusing lens for focusing the optical signal from the first dispersive element; and
   a spatial light modulator for controlling a phase of the optical signal focused with the at least one focusing lens,
   wherein in a direction of a first dispersion axis defined as an intersecting line between a plane of the spatial light modulator and a first dispersion plane formed by the first dispersive element, a phase distribution provided by a function expressed in a second-order or more polynomial with respect to the first dispersion axis is imparted to the optical signal by the spatial light modulator, and
   wherein the spatial light modulator includes a plurality of pixels to each of which a discrete phase value can be set, the plurality of pixels being repeatedly arranged in the direction of the first dispersion axis, and satisfies the following relationship, $wx \geq wp$, where
   a beam radius wx is defined as a distance at which an optical intensity of monochromatic light is $1/e^2$ of a peak value on the spatial light modulator plane, and wp is a repetitive distance of the pixel.

2. The dispersion compensator according to claim 1, wherein when a phase value exceeds $2\pi$ in the phase distribution, a remainder phase obtained by dividing the phase value exceeding $2\pi$ by $2\pi$ is imparted to the optical signal.

3. The dispersion compensator according to claim 2, wherein the spatial light modulator has a plurality of pixel arrays each of which is arranged at a repetitive distance wSLMv in a direction of a second dispersion axis orthogonal to the direction of the first dispersion axis.

4. The dispersion compensator according to claim 3, wherein when a desired phase setting value is $\phi$ for a position in the direction of the first dispersion axis, the position being encompassed in a pixel group covered with a light beam at a focal point, a phase distribution is imparted to a plurality of pixels which include the position and arranged in a direction orthogonal to the first dispersion axis such that the average value of the phases of the plurality of pixels weighted according to the optical power incident upon each pixel is equal to $\phi$.

5. The dispersion compensator according to claim 4, wherein
   the first dispersive element includes an arrayed-waveguide grating including an input waveguide, a slab waveguide and an arrayed waveguide, and
   the at least one focusing lens includes
   a cylindrical lens collimating an emitted light beam from an optical signal output end of the arrayed waveguide in a direction perpendicular to the first dispersion plane, and a focusing lens having a focal distance f and located at a distance f from both the output end of the arrayed waveguide and the spatial light modulator.

6. The dispersion compensator according to claim 5, further comprising:
a second dispersive element interposed between the cylindrical lens and the focusing lens, the second dispersive element having a second dispersion plane approximately orthogonal to the first dispersion plane of the arrayed-waveguide grating, wherein
the spatial light modulator has two dimensional pixels which are each repeatedly arranged in a cyclic manner, along the first dispersion axis corresponding to the first dispersion plane and the second dispersion axis approximately orthogonal to the first dispersion axis and corresponding to the second dispersion plane.

7. The dispersion compensator according to claim 6, wherein a free spectral range of the arrayed-waveguide grating is equal to a grid wavelength interval between WDM optical signals for which a dispersion compensation is made based on the phase distribution.

8. The dispersion compensator according to claim 3, wherein
the first dispersive element includes an arrayed-waveguide grating including an input waveguide, a slab waveguide and an arrayed waveguide, and
the at least one focusing lens includes
a cylindrical lens collimating an emitted light beam from an optical signal output end of the arrayed waveguide in a direction perpendicular to the first dispersion plane, and
a focusing lens having a focal distance f and located at a distance f from both the output end of the arrayed waveguide and the spatial light modulator, the dispersion compensator further comprising:
a second dispersive element interposed between the cylindrical lens and the focusing lens, the second dispersive element having a second dispersion plane approximately orthogonal to the first dispersion plane of the arrayed-waveguide grating, wherein
the spatial light modulator has two dimensional pixels which are each repeatedly arranged in a cyclic manner, along the first dispersion axis corresponding to the first dispersion plane and the second dispersion axis approximately orthogonal to the first dispersion axis and corresponding to the second dispersion plane.

9. The dispersion compensator according to claim 8, wherein a free spectral range of the arrayed-waveguide grating is equal to a grid wavelength interval between WDM optical signals for which a dispersion compensation is made based on the phase distribution.

10. The dispersion compensator according to claim 2, wherein
the first dispersive element includes an arrayed-waveguide grating including an input waveguide, a slab waveguide and an arrayed waveguide, and
the at least one focusing lens includes
a cylindrical lens collimating an emitted light beam from an optical signal output end of the arrayed waveguide in a direction perpendicular to the first dispersion plane, and
a focusing lens having a focal distance f and located at a distance f from both the output end of the arrayed waveguide and the spatial light modulator.

11. The dispersion compensator according to claim 2, wherein
the first dispersive element includes an arrayed-waveguide grating including an input waveguide, a slab waveguide and an arrayed waveguide, and
the at least one focusing lens includes
a cylindrical lens collimating an emitted light beam from an optical signal output end of the arrayed waveguide in a direction perpendicular to the first dispersion plane, and
a focusing lens having a focal distance f and located at a distance f from both the output end of the arrayed waveguide and the spatial light modulator.

12. The dispersion compensator according to claim 2 wherein the dispersive element is configured such that on the first dispersion axis of the spatial light modulator, a light beam emitted from the dispersive element has an electric field distribution of a sinc function shaped beam when the light beam is focused with the focusing lens.

13. The dispersion compensator according to claim 2, further comprising:
an optical tap having an output connected to an input of the dispersion compensator; and
a wavelength demultiplexer having an input connected to an output of the dispersion compensator.

14. The dispersion compensator according to claim 13, further comprising:
a second dispersive element interposed between the cylindrical lens and the focusing lens, the second dispersive element having a second dispersion plane approximately orthogonal to the first dispersion plane of the arrayed-waveguide grating, wherein
the spatial light modulator has two dimensional pixels which are each repeatedly arranged in a cyclic manner, along the first dispersion axis corresponding to the first dispersion plane and the second dispersion axis approximately orthogonal to the first dispersion axis and corresponding to the second dispersion plane.

15. The dispersion compensator according to claim 1, wherein the spatial light modulator has a plurality of pixel arrays each of which is arranged at a repetitive distance wSLMv in a direction of a second dispersion axis orthogonal to the direction of the first dispersion axis.

16. The dispersion compensator according to claim 15, wherein
the first dispersive element includes an arrayed-waveguide grating including an input waveguide, a slab waveguide and an arrayed waveguide, and
the at least one focusing lens includes
a cylindrical lens collimating an emitted light beam from an optical signal output end of the arrayed waveguide in a direction perpendicular to the first dispersion plane, and
a focusing lens having a focal distance f and located at a distance f from both the output end of the arrayed waveguide and the spatial light modulator, the dispersion compensator further comprising:
a second dispersive element interposed between the cylindrical lens and the focusing lens, the second dispersive element having a second dispersion plane approximately orthogonal to the first dispersion plane of the arrayed-waveguide grating, wherein
the spatial light modulator has two dimensional pixels which are each repeatedly arranged in a cyclic manner, along the first dispersion axis corresponding to the first dispersion plane and the second dispersion axis approximately orthogonal to the first dispersion axis and corresponding to the second dispersion plane.

17. The dispersion compensator according to claim 16, wherein a free spectral range of the arrayed-waveguide grating is equal to a grid wavelength interval between WDM optical signals for which a dispersion compensation is made based on the phase distribution.

18. The dispersion compensator according to claim 15, wherein when a desired phase setting value is φ for a position in the direction of the first dispersion axis, the position being encompassed in a pixel group covered with a light beam at a focal point, a phase distribution is imparted to a plurality of pixels which include the position and arranged in a direction orthogonal to the first dispersion axis such that the average value of the phases of the plurality of pixels weighted according to the optical power incident upon each pixel is equal to φ.

19. The dispersion compensator according to claim 18, wherein
the first dispersive element includes an arrayed-waveguide grating including an input waveguide, a slab waveguide and an arrayed waveguide, and
the at least one focusing lens includes
a cylindrical lens collimating an emitted light beam from an optical signal output end of the arrayed waveguide in a direction perpendicular to the first dispersion plane, and
a focusing lens having a focal distance f and located at a distance f from both the output end of the arrayed waveguide and the spatial light modulator.

20. The dispersion compensator according to claim 19, further comprising:
a second dispersive element interposed between the cylindrical lens and the focusing lens, the second dispersive element having a second dispersion plane approximately orthogonal to the first dispersion plane of the arrayed-waveguide grating, wherein
the spatial light modulator has two dimensional pixels which are each repeatedly arranged in a cyclic manner, along the first dispersion axis corresponding to the first dispersion plane and the second dispersion axis approximately orthogonal to the first dispersion axis and corresponding to the second dispersion plane.

21. The dispersion compensator according to claim 20, wherein a free spectral range of the arrayed-waveguide grating is equal to a grid wavelength interval between WDM optical signals for which a dispersion compensation is made based on the phase distribution.

22. The dispersion compensator according to claim 1, wherein
the first dispersive element includes an arrayed-waveguide grating including an input waveguide, a slab waveguide and an arrayed waveguide, and
the at least one focusing lens includes
a cylindrical lens collimating an emitted light beam from an optical signal output end of the arrayed waveguide in a direction perpendicular to the first dispersion plane, and
a focusing lens having a focal distance f and located at a distance f from both the output end of the arrayed waveguide and the spatial light modulator.

23. The dispersion compensator according to claim 1, wherein the dispersive element is configured such that on the first dispersion axis of the spatial light modulator, a light beam emitted from the dispersive element has an electric field distribution of a sinc function shaped beam when the light beam is focused with the focusing lens.

24. The dispersion compensator according to claim 1 further comprising:
an optical tap having an output connected to an input of the dispersion compensator; and
a wavelength demultiplexer having an input connected to an output of the dispersion compensator.

25. The dispersion compensator according to claim 24, further comprising:
a second dispersive element interposed between the cylindrical lens and the focusing lens, the second dispersive element having a second dispersion plane approximately orthogonal to the first dispersion plane of the arrayed-waveguide grating, wherein
the spatial light modulator has two dimensional pixels which are each repeatedly arranged in a cyclic manner, along the first dispersion axis corresponding to the first dispersion plane and the second dispersion axis approximately orthogonal to the first dispersion axis and corresponding to the second dispersion plane.

26. A dispersion compensator comprising:
a first dispersive element for dispersing an optical signal at an angle according to a wavelength of an input optical signal;
at least one focusing lens for focusing the optical signal from the first dispersive element; and
a spatial light modulator for controlling a phase of the optical signal focused with the at least one focusing lens,
wherein in a direction of a first dispersion axis defined as an intersecting line between a plane of the spatial light modulator and a first dispersion plane formed by the first dispersive element, a phase distribution provided by a function expressed in a second-order or more polynomial with respect to the first dispersion axis is imparted to the optical signal by the spatial light modulator, and
the first dispersive element includes an arrayed-waveguide grating including an input waveguide, a slab waveguide and an arrayed waveguide, and
the at least one focusing lens includes
a cylindrical lens collimating an emitted light beam from an optical signal output end of the arrayed waveguide in a direction perpendicular to the first dispersion plane, and
a focusing lens having a focal distance f and located at a distance f from both the output end of the arrayed waveguide and the spatial light modulator.

27. A dispersion compensator comprising:
a first dispersive element for dispersing an optical signal at an angle according to a wavelength of an input optical signal;
at least one focusing lens for focusing the optical signal from the first dispersive element; and
a spatial light modulator for controlling a phase of the optical signal focused with the at least one focusing lens, wherein
the spatial light modulator includes a plurality of pixels for each of which a discrete phase value can be set, the plurality of pixels being repeatedly arranged in a direction of a first dispersion axis defined as an intersecting line between a plane of the spatial light modulator and a first dispersion plane formed by the first dispersive element,
the plurality of pixels are divided into a plurality of sections each including some of the plurality of pixels, so that in each of the sections, a phase distribution provided by a function expressed in a second-order or more polynomial with respect to the first dispersion axis is independently allocated to the optical signal having a different wavelength, and the following relationship also is satisfied:

$$wx \geq wp$$

where a beam radius wx is defined as a distance at which an optical intensity of monochromatic light is $1/e^2$ of a peak value on the spatial light modulator plane, and wp is a repetitive distance of the pixel.

28. The dispersion compensator according to claim 27, wherein when a phase value exceeds $2\pi$ in the phase distribution, a remainder phase obtained by dividing the phase value exceeding $2\pi$ by $2\pi$ is imparted to the optical signal.

29. The dispersion compensator according to claim 27, further comprising:
 an optical tap having an output connected to an input of the dispersion compensator; and
 a wavelength demultiplexer having an input connected to an output of the dispersion compensator.

30. The dispersion compensator according to claim 29, wherein when a phase value exceeds $2\pi$ in the phase distribution, a remainder phase obtained by dividing the phase value exceeding $2\pi$ by $2\pi$ is imparted to the optical signal.

* * * * *